US009771199B2

(12) United States Patent
Kerr et al.

(10) Patent No.: US 9,771,199 B2
(45) Date of Patent: Sep. 26, 2017

(54) PROBIOTIC SUPPLEMENT, PROCESS FOR MAKING, AND PACKAGING

(75) Inventors: George Scott Kerr, Mason, OH (US); Gregory Dean Sunvold, Lewisburg, OH (US); Lawrence Andrew Schumacher, Trenton, OH (US); David William Schuller, Lebanon, OH (US); Robbert H ter Haar, Dayton, OH (US); Michael J Bittner, Charlotte, NC (US)

(73) Assignee: Mars, Incorporated, McLean, VA (US)

( * ) Notice: Subject to any disclaimer, the term of this patent is extended or adjusted under 35 U.S.C. 154(b) by 1100 days.

(21) Appl. No.: 12/168,400

(22) Filed: Jul. 7, 2008

(65) Prior Publication Data

US 2010/0003368 A1 Jan. 7, 2010

(51) Int. Cl.

| | |
|---|---|
| ***B65D 75/36*** | (2006.01) |
| ***A23K 10/16*** | (2016.01) |
| ***A23K 10/18*** | (2016.01) |
| ***A23K 50/40*** | (2016.01) |

(52) U.S. Cl.

CPC .............. *B65D 75/36* (2013.01); *A23K 10/16* (2016.05); *A23K 10/18* (2016.05); *A23K 50/40* (2016.05)

(58) Field of Classification Search

CPC ...................................................... B65D 75/36
USPC .................. 426/120; 206/461, 538, 515, 518
See application file for complete search history.

(56) References Cited

U.S. PATENT DOCUMENTS

| | | | | |
|---|---|---|---|---|
| 571,521 | A * | 11/1896 | Heberline et al. | 206/459.5 |
| 1,086,936 | A | 2/1914 | Pounder et al. | |
| 1,503,094 | A | 7/1924 | Cramer | |
| 2,473,773 | A | 6/1949 | West | |

(Continued)

FOREIGN PATENT DOCUMENTS

| | | |
|---|---|---|
| AU | 199642145 | 8/1996 |
| AU | 199928098 | 7/1999 |

(Continued)

OTHER PUBLICATIONS

Physicians' Desk Reference, 1963 Edition, Medical Economics, Inc. Oradell, N.J., 1962, Product Identification Section Section Four, p. VIII and XI.*

(Continued)

*Primary Examiner* — Erik Kashnikow
*Assistant Examiner* — Chaim Smith
(74) *Attorney, Agent, or Firm* — Mars, Incorporated; Yeun Li

(57) ABSTRACT

A pet food composition comprising a supplement is provided. The supplement can comprise a Probiotic component, a cocoa butter component, and a sweetener component. A process for making the supplement can comprise providing a sweetener component, a cocoa butter component, and a Probiotic component, mixing the cocoa butter component and Probiotic component to form a mixture in a temperature and humidity controlled chamber; mixing the mixture with the sweetener component in the temperature and humidity controlled chamber to form a final mixture; optionally mixing in a colorant with the final mixture; and cooling the final mixture. A package for the supplement can comprise a secondary container housing a primary container, which houses a supplement. An array of packages is also provided.

12 Claims, 7 Drawing Sheets

30
33
32
31

(56) References Cited

U.S. PATENT DOCUMENTS 2,540,979 A 2/1951 Clymer et al.
2,641,548 A 6/1953 Heinrich
3,320,130 A 5/1967 Henry
3,398,001 A 8/1968 Benson
3,429,426 A * 2/1969 Weller Otto et al. ......... 206/531
3,431,338 A 3/1969 Munzel
3,677,898 A 7/1972 Mitsugi et al.
3,764,715 A 10/1973 Henthorn
3,897,572 A 7/1975 Riggs et al.
3,898,132 A 8/1975 Heltrick
3,916,029 A 10/1975 Hildebolt
3,922,353 A 11/1975 Bernotavicz
3,931,885 A * 1/1976 Nahill et al. .................. 206/538
3,957,974 A 5/1976 Hata
3,966,997 A 6/1976 Warkentin
3,989,822 A 11/1976 Whistler
4,018,908 A 4/1977 Gross
4,034,115 A 7/1977 Roberts
4,055,681 A 10/1977 Balaz et al.
4,072,766 A 2/1978 Luddy
4,248,857 A 2/1981 DeNeale et al.
4,295,567 A * 10/1981 Knudsen ....................... 206/534
4,314,995 A 2/1982 Hata et al.
4,332,790 A 6/1982 Sozzi et al.
4,338,346 A 7/1982 Brand
4,399,163 A 8/1983 Brennan et al.
4,403,623 A 9/1983 Mark
4,411,925 A 10/1983 Brennan et al.
4,423,029 A 12/1983 Rizzi
4,434,231 A 2/1984 Jung
4,460,610 A 7/1984 Macfie
4,508,741 A 4/1985 Corbett et al.
4,518,696 A 5/1985 Gerhmann et al.
4,592,748 A 6/1986 Jost
4,594,259 A 6/1986 Baker et al.
4,647,453 A 3/1987 Meisner
4,736,849 A * 4/1988 Leonard et al. .............. 206/534
4,758,446 A 7/1988 Johansson et al.
4,764,389 A 8/1988 LaBarge
4,767,623 A 8/1988 Conway et al.
4,781,939 A 11/1988 Martin et al.
4,786,507 A 11/1988 Schmidt
4,797,289 A 1/1989 Reddy
4,806,368 A 2/1989 Reddy
4,808,626 A 2/1989 Friedman et al.
4,814,193 A 3/1989 Shenouda et al.
4,816,259 A 3/1989 Matthews et al.
4,859,377 A 8/1989 Sasha et al.
4,889,238 A * 12/1989 Batchelor ..................... 206/535
4,935,247 A 6/1990 Martila et al.
4,937,077 A 6/1990 Deetz, III
4,971,820 A 11/1990 Likuski et al.
4,997,671 A 3/1991 Spanier
5,032,399 A 7/1991 Gorbach et al.
5,069,915 A 12/1991 Devitt
5,096,717 A 3/1992 Wirth et al.
5,132,137 A 7/1992 Reimann
5,158,800 A 10/1992 Bell
5,160,745 A 11/1992 DeLuca et al.
5,171,580 A 12/1992 Imartino et al.
5,176,911 A 1/1993 Tosi et al.
5,286,495 A 2/1994 Batich et al.
5,292,657 A 3/1994 Rutherford et al.
5,296,233 A 3/1994 Batista et al.
5,322,686 A 6/1994 Grahn et al.
5,344,824 A 9/1994 Ohkuma et al.
5,389,389 A 2/1995 Beck
5,413,960 A 5/1995 Dobrogosz et al.
5,445,828 A 8/1995 Pozzi et al.
5,451,400 A 9/1995 Stern et al.
5,474,932 A 12/1995 Bengmark et al.
5,484,721 A 1/1996 Ors et al.
5,501,857 A 3/1996 Zimmer
5,501,868 A 3/1996 Collings
5,516,684 A 5/1996 Saito et al.
5,518,733 A 5/1996 Lamothe et al.
5,527,556 A 6/1996 Frippiat
5,531,988 A 7/1996 Paul
5,538,743 A 7/1996 Heinemann et al.
5,540,945 A 7/1996 Ikushima
5,569,634 A 10/1996 Miller et al.
5,573,793 A 11/1996 Saintain
5,573,850 A 11/1996 Cunningham et al.
5,578,302 A 11/1996 Brassart et al.
5,582,643 A 12/1996 Takei et al.
5,603,930 A 2/1997 Brassart
5,629,017 A 5/1997 Pozzi et al.
5,633,012 A 5/1997 Ford
5,643,623 A 7/1997 Schmitz
5,645,830 A 7/1997 Reid
5,695,797 A 12/1997 Geromin
5,698,437 A 12/1997 Matsuda et al.
5,716,655 A 2/1998 Hamstra et al.
5,726,161 A 3/1998 Whistler
5,728,380 A 3/1998 Allen et al.
5,733,540 A 3/1998 Lee
5,756,088 A 5/1998 Matsuura et al.
5,766,520 A 6/1998 Brohnshtein
5,785,990 A 7/1998 Langreher
5,814,338 A 9/1998 Veronesi
5,824,779 A 10/1998 Koegel et al.
5,849,327 A 12/1998 Berliner et al.
5,853,697 A 12/1998 Strober et al.
5,854,067 A 12/1998 Newgard et al.
5,858,356 A 1/1999 Wolf et al.
5,871,794 A 2/1999 Brito
5,871,802 A 2/1999 Gao
5,894,029 A 4/1999 Brown et al.
5,910,447 A 6/1999 Lawrence et al.
5,925,190 A 7/1999 Richards
5,932,258 A 8/1999 Sunvold
5,939,117 A 8/1999 Chen et al.
5,952,021 A 9/1999 Santus
5,952,033 A 9/1999 Anantharaman et al.
5,962,043 A 10/1999 Jones
5,968,569 A 10/1999 Cavadini et al.
5,976,579 A 11/1999 McLean
6,007,808 A 12/1999 DeHaen et al.
6,010,725 A 1/2000 Meister et al.
6,033,888 A 3/2000 Batich et al.
6,042,857 A 3/2000 Jones et al.
6,063,414 A 5/2000 Jones et al.
6,077,530 A * 6/2000 Weinstein et al. ............ 424/451
6,080,401 A 6/2000 Reddy et al.
6,083,520 A 7/2000 Toneby
6,093,425 A 7/2000 Kamarei
6,117,477 A 9/2000 Paluch et al.
6,133,323 A 10/2000 Hayek
6,136,353 A 10/2000 Munz
6,146,681 A 11/2000 Kuwano
6,153,236 A 11/2000 Wu et al.
6,156,355 A 12/2000 Shields et al.
6,190,591 B1 2/2001 Van Lengerich
6,197,361 B1 3/2001 Anantharaman
6,214,336 B1 4/2001 Bukowska et al.
6,248,366 B1 6/2001 Scammeli
6,251,478 B1 6/2001 Pacifico et al.
6,254,886 B1 7/2001 Fusca et al.
6,254,910 B1 7/2001 Paluch
6,277,370 B1 8/2001 Vavaliere Ved Vesely et al.
6,309,666 B1 10/2001 Hatano et al.
6,310,090 B1 10/2001 Hayek
6,312,746 B2 11/2001 Paluch
6,355,242 B1 3/2002 Allison et al.
6,358,555 B1 3/2002 Takahashi
6,365,148 B1 4/2002 Kim et al.
6,375,956 B1 * 4/2002 Hermelin et al. ............ 424/400
6,394,803 B1 * 5/2002 Salz et al. ....................... 433/49
6,406,853 B1 6/2002 Spindler
6,440,477 B2 8/2002 Nishioka et al.
6,451,341 B1 9/2002 Slaga et al.
6,500,463 B1 12/2002 Van Lengerich
6,506,389 B2 1/2003 Leer et al.
6,517,903 B1 2/2003 Schmidt

(56) References Cited

U.S. PATENT DOCUMENTS 6,537,544 B1 3/2003 Johansson et al.
6,544,568 B2 4/2003 La Droitte et al.
6,555,148 B1 4/2003 Hamstra
6,562,336 B2 5/2003 De Simone
6,572,854 B1 6/2003 De Simone
6,586,027 B2 7/2003 Axelrod et al.
6,589,328 B1 7/2003 Nussinovitch
6,592,863 B2 7/2003 Fuchs et al.
6,596,946 B2 7/2003 Chapnick et al.
6,607,905 B1 8/2003 Luquet
6,620,440 B1 9/2003 Hsia
6,624,162 B2 9/2003 Chapnick et al.
6,681,935 B1* 1/2004 Lewis .......................... 206/534
6,706,263 B2 3/2004 Ranganathan et al.
6,713,083 B1 3/2004 McGregor et al.
6,723,358 B1 4/2004 Van Lengerich
6,733,795 B2 5/2004 Piccirilli et al.
6,737,089 B2 5/2004 Wadsworth et al.
6,740,350 B2 5/2004 Pfeiffer
6,746,672 B2 6/2004 O'Sullivan
6,767,573 B1 7/2004 Dixon et al.
6,780,433 B2 8/2004 Cochran et al.
6,797,266 B2 9/2004 Naidu
6,802,422 B2* 10/2004 Kalvelage et al. ........... 206/538
6,827,957 B2 12/2004 Paluch et al.
6,835,376 B1 12/2004 Neeser et al.
6,835,397 B2 12/2004 Lee et al.
6,887,493 B2 5/2005 Shefer et al.
6,893,662 B2 5/2005 Dittmar et al.
6,896,914 B2 5/2005 Chapnick et al.
6,905,679 B1 6/2005 Schiffrin et al.
6,911,217 B1 6/2005 Gren et al.
6,932,990 B2 8/2005 Konishi et al.
6,939,560 B2 9/2005 Shen et al.
6,974,594 B2 12/2005 Ko et al.
6,979,675 B2 12/2005 Tidmarsh
6,991,819 B2 1/2006 Pannevis et al.
7,008,648 B2 3/2006 Corley et al.
7,029,669 B1 4/2006 Reniero et al.
7,037,708 B1 5/2006 Runge et al.
7,052,688 B2 5/2006 De Simone
7,081,478 B2 7/2006 Hauptmann et al.
7,097,831 B1 8/2006 Bengs et al.
7,115,297 B2 10/2006 Stillman et al.
7,122,370 B2 10/2006 Porubcan
RE39,436 E 12/2006 Spindler et al.
7,150,986 B2 12/2006 Kato et al.
7,179,460 B2 2/2007 Dennin et al.
7,186,545 B2 3/2007 Collins et al.
7,189,390 B2 3/2007 Zink et al.
7,195,906 B2 3/2007 Collins et al.
7,201,923 B1 4/2007 Van Lengerich et al.
7,211,280 B1 5/2007 Young et al.
7,229,818 B2 6/2007 Porubcan
7,235,276 B2 6/2007 Allen et al.
7,235,395 B2 6/2007 Stadler et al.
7,390,519 B2 6/2008 Collins et al.
7,427,398 B2 9/2008 Baillon et al.
7,544,497 B2 6/2009 Sinclair et al.
7,579,030 B2 8/2009 Domingues et al.
7,604,809 B2 10/2009 Postaire et al.
D605,527 S 12/2009 Kerr
D606,278 S 12/2009 Kerr
7,666,459 B2 2/2010 Hayek et al.
7,670,612 B2 3/2010 Miller
7,687,085 B2 3/2010 Hayashi et al.
7,785,621 B2 8/2010 Maurer et al.
7,785,635 B1 8/2010 Boileau et al.
7,795,227 B2 9/2010 Kriegler et al.
7,816,547 B2 10/2010 Msika et al.
7,833,554 B2 11/2010 Piccirilli et al.
7,842,329 B2 11/2010 Saylock et al.
D631,757 S 2/2011 Kerr
7,897,579 B2 3/2011 Piccirilli et al.
7,906,112 B2 3/2011 Boileau et al.
7,910,144 B2 3/2011 Ballevre et al.
D640,564 S 6/2011 Kerr
7,960,605 B2 6/2011 Zhao-Wilson
8,030,279 B2 10/2011 Joullie
8,034,601 B2 10/2011 Boileau et al.
D651,095 S 12/2011 Kerr
D651,524 S 1/2012 Kerr
8,142,810 B2 3/2012 Sunvold
8,313,757 B2 11/2012 Van Lengerich
8,349,377 B2 1/2013 Piccirilli et al.
8,486,389 B2 7/2013 Sidhu et al.
8,557,764 B2 10/2013 Newell et al.
8,563,522 B2 10/2013 Pitha et al.
8,637,495 B2 1/2014 Waldron et al.
8,663,729 B2 3/2014 Hayek et al.
8,691,303 B2 4/2014 Sunvold et al.
8,722,112 B2 5/2014 Zicker et al.
8,728,559 B2 5/2014 Hayek et al.
8,771,675 B2 7/2014 Zink et al.
8,802,158 B2 8/2014 Boileau et al.
8,802,179 B2 8/2014 Miller
8,808,770 B2 8/2014 Henderson et al.
8,809,035 B2 8/2014 Boileau et al.
8,877,178 B2 11/2014 Boileau et al.
8,894,991 B2 11/2014 Boileau et al.
8,900,569 B2 12/2014 Boileau et al.
9,023,810 B2 5/2015 Piccirilli et al.
9,089,576 B2 7/2015 Piccirilli et al.
9,119,843 B2 9/2015 Chen et al.
9,192,177 B2 11/2015 Boileau et al.
9,210,945 B2 12/2015 Horgan
9,232,813 B2 1/2016 Ter Haar et al.
2001/0048955 A1 12/2001 Foreman et al.
2002/0022019 A1* 2/2002 Laulund ..................... 424/93.45
2002/0035071 A1 3/2002 Pitha et al.
2002/0112449 A1* 8/2002 Heath et al. .................... 53/440
2002/0119237 A1 8/2002 Hevey
2002/0127211 A1 9/2002 Brassart et al.
2003/0026876 A1 2/2003 Albuja et al.
2003/0049240 A1 3/2003 Bellevre et al.
2003/0060503 A1 3/2003 Hamilton
2003/0104090 A1 6/2003 Levy et al.
2003/0113306 A1 6/2003 Collins et al.
2003/0143293 A1 7/2003 Shushunov
2003/0157166 A1 8/2003 Chen et al.
2003/0170217 A1 9/2003 Collins et al.
2003/0170355 A1 9/2003 Glazier et al.
2003/0190309 A1 10/2003 Zink et al.
2003/0190314 A1 10/2003 Campbell et al.
2003/0194423 A1 10/2003 Torney et al.
2003/0215547 A1 11/2003 Leyh
2004/0001817 A1 1/2004 Giampapa et al.
2004/0013706 A1 1/2004 Baur et al.
2004/0047896 A1 3/2004 Malnoe et al.
2004/0071714 A1 4/2004 Germond et al.
2004/0115178 A1 6/2004 Schiffrin et al.
2004/0115308 A1 6/2004 Bengtsson Riveros et al.
2004/0115773 A1 6/2004 Arigoni et al.
2004/0147010 A1 7/2004 Vidal et al.
2004/0161422 A1 8/2004 Ranganathan
2004/0167229 A1 8/2004 Bakker-Arkema et al.
2004/0219157 A1 11/2004 Rochat et al.
2004/0234579 A1 11/2004 Finke
2004/0253357 A1 12/2004 De Zarate
2004/0265279 A1 12/2004 Dinan et al.
2005/0013849 A1 1/2005 Lemaure et al.
2005/0074519 A1 4/2005 Bartnick et al.
2005/0079244 A1 4/2005 Giffard et al.
2005/0084479 A1 4/2005 Corthesy et al.
2005/0100617 A1 5/2005 Malnoe et al.
2005/0106131 A1 5/2005 Breton et al.
2005/0106133 A1 5/2005 Zink et al.
2005/0112179 A1 5/2005 Khoo
2005/0112259 A1 5/2005 Qvyjt
2005/0147649 A1 7/2005 Perez et al.
2005/0152884 A1 7/2005 Boileau et al.
2005/0153018 A1 7/2005 Ubbink et al.
2005/0158294 A1 7/2005 Boileau et al.
2005/0164978 A1 7/2005 Chapnick et al.

(56) References Cited

U.S. PATENT DOCUMENTS

2005/0180961 A1 8/2005 Pecquet et al.
2005/0208163 A1 9/2005 Brovelli et al.
2005/0214420 A1 9/2005 Schmidt et al.
2005/0249837 A1 11/2005 Massimino et al.
2005/0266438 A1 12/2005 Spindler
2005/0271643 A1 12/2005 Sorokulova
2005/0276882 A1 12/2005 Bishop
2005/0281910 A1 12/2005 Schiffrin et al.
2006/0002909 A1 1/2006 Takeda
2006/0008511 A1 1/2006 Lin et al.
2006/0062892 A1 3/2006 Merrick
2006/0070895 A1* 4/2006 Khawaja ...................... 206/223
2006/0099196 A1 5/2006 Breton et al.
2006/0100162 A1 5/2006 Pitha et al.
2006/0116330 A1 6/2006 Pitha et al.
2006/0121015 A1 6/2006 Collins et al.
2006/0147962 A1 7/2006 Jones et al.
2006/0165670 A1 7/2006 Berr et al.
2006/0228448 A1* 10/2006 Boileau et al. ................ 426/61
2006/0228459 A1 10/2006 Tribelhorn et al.
2006/0263416 A1 11/2006 Brent, Jr.
2006/0270020 A1 11/2006 Boileau et al.
2007/0009577 A1 1/2007 Mankovitz
2007/0020328 A1 1/2007 Lin
2007/0031441 A1 2/2007 Collins et al.
2007/0053956 A1 3/2007 Tandler et al.
2007/0082107 A1 4/2007 Almutis et al.
2007/0098744 A1 5/2007 Knorr et al.
2007/0098784 A1 5/2007 Moger
2007/0100251 A1 5/2007 Prichep
2007/0104700 A1 5/2007 Garcia Rodenas et al.
2007/0116826 A1 5/2007 Prakash et al.
2007/0116853 A1 5/2007 Krohn et al.
2007/0122531 A1 5/2007 Considine et al.
2007/0123460 A1 5/2007 Chang et al.
2007/0129428 A1 6/2007 Richelle et al.
2007/0149466 A1 6/2007 Milburn et al.
2007/0160589 A1 7/2007 Mattson et al.
2007/0166295 A1 7/2007 Schildgen et al.
2007/0178078 A1 8/2007 Khoo
2007/0178079 A1 8/2007 Zink et al.
2007/0184177 A1 8/2007 Harrison et al.
2007/0190171 A1 8/2007 Yamka et al.
2007/0202087 A1 8/2007 Baillon et al.
2007/0218164 A1 9/2007 Stojanovic
2007/0231371 A1 10/2007 Pan et al.
2007/0231414 A1 10/2007 Aoki et al.
2007/0269515 A1 11/2007 Henriksen et al.
2007/0269553 A1 11/2007 Le et al.
2007/0280964 A1 12/2007 Knorr et al.
2007/0286935 A1 12/2007 Grigorov et al.
2008/0021073 A1 1/2008 Bueno Calderon et al.
2008/0044481 A1 2/2008 Harel
2008/0050354 A1 2/2008 Garault
2008/0050355 A1 2/2008 Vaslin
2008/0053490 A1* 3/2008 Clark et al. .................... 134/34
2008/0057109 A1 3/2008 Collins et al.
2008/0102163 A1 5/2008 O'Toole
2008/0107699 A1* 5/2008 Spigelman et al. .......... 424/404
2008/0145341 A1 6/2008 Myatt et al.
2008/0175957 A1 7/2008 Horgan et al.
2008/0214479 A1 9/2008 Pitha et al.
2008/0241226 A1* 10/2008 Abeln et al. ................. 424/439
2008/0260696 A1 10/2008 Massimino et al.
2008/0260866 A1 10/2008 Massimino et al.
2008/0279786 A1 11/2008 Cash
2009/0017163 A1 1/2009 Garbolino et al.
2009/0252834 A1 10/2009 Hayek et al.
2010/0003368 A1 1/2010 Kerr
2010/0003369 A1 1/2010 Ter Haar et al.
2010/0028483 A1 2/2010 Wasserfuhr
2010/0112003 A1 5/2010 Collins et al.
2010/0203225 A1 8/2010 Kerr et al.
2010/0233320 A1 9/2010 Sunvold et al.
2010/0260795 A1 10/2010 Mombarg et al.
2011/0008493 A1 1/2011 Zorea
2011/0027419 A1 2/2011 Sunvold et al.
2011/0274676 A1 11/2011 Farmer et al.
2012/0115798 A1 5/2012 Massimino et al.
2012/0156330 A1 6/2012 Nakhasi et al.
2012/0282373 A1 11/2012 Luhadiya et al.
2012/0283197 A1 11/2012 Luhadiya et al.
2013/0183255 A1 7/2013 Saunois et al.
2013/0295227 A1 11/2013 Ter Haar et al.
2014/0274920 A1 9/2014 Davenport
2014/0348975 A1 11/2014 Davenport et al.
2014/0348986 A1 11/2014 Beyer et al.
2014/0349002 A1 11/2014 Beyer
2015/0132420 A1 5/2015 Villagran et al.
2015/0208679 A1 7/2015 Mir et al.

FOREIGN PATENT DOCUMENTS

AU 199964420 7/2000
CA 1300538 5/1992
CA 2093287 * 10/1993 ............ B65B 47/00
CA 2256256 6/2000
CA 2569249 11/2005
CN 1247036 3/2000
DE 3715070 11/1988
DE 4018392 12/1991
DE 102 17 970 * 11/2003 ............ B65D 75/36
EP 0088574 9/1983
EP 0168112 1/1986
EP 0181170 5/1986
EP 0212746 3/1987
EP 0212747 3/1987
EP 0298605 1/1989
EP 0391416 10/1990
EP 0399819 11/1990
EP 0500178 8/1992
EP 0516896 12/1992
EP 0 563 934 * 10/1993 ............ B65D 75/34
EP 0627173 12/1994
EP 0704164 4/1996
EP 0850569 7/1998
EP 0904784 3/1999
EP 0914831 5/1999
EP 0930316 7/1999
EP 1269857 1/2003
EP 1547466 6/2005
EP 1 637 041 A1 3/2006
EP 1688044 8/2006
EP 1806056 A1 7/2007
EP 1806057 A1 7/2007
FR 2615203 11/1988
FR 2663198 12/1991
GB 1190387 5/1970
GB 1238336 7/1971
GB 1470745 4/1977
GB 1503094 3/1978
GB 1509339 5/1978
GB 1595054 8/1981
GB 2241421 9/1990
GB 2252228 8/1992
GB 2334443 8/1999
JP S59213368 12/1984
JP S6024153 2/1985
JP S62163662 7/1987
JP S62201823 9/1987
JP H02265548 10/1990
JP 03076561 4/1991
JP H06256170 9/1994
JP H08242763 9/1996
JP 2000191519 7/2000
JP 2001278781 10/2001
JP 2007/117083 A2 11/2001
JP 2001309753 11/2001
JP 2002191297 7/2002
JP 2003120965 4/2003
JP 1995378530 8/2003
JP 2004/173675 A2 6/2004
JP 2004173675 6/2004
JP 2006020581 1/2006

(56) References Cited

FOREIGN PATENT DOCUMENTS

| | | | |
|---|---|---|---|
| JP | 2006/055145 | A2 | 3/2006 |
| JP | 2006166807 | | 6/2006 |
| JP | 2007/117083 | A2 | 5/2007 |
| JP | 2007330180 | | 12/2007 |
| KR | 2050048 | A | 6/2002 |
| KR | 20040024774 | | 3/2004 |
| RU | 2086248 | | 8/1997 |
| RU | 2123343 | | 12/1998 |
| RU | 2185838 | | 7/2002 |
| RU | 2388320 | | 5/2010 |
| RU | 2407401 | | 12/2010 |
| SU | 1704744 | | 1/1992 |
| WO | 8808452 | | 11/1988 |
| WO | 8905849 | | 6/1989 |
| WO | 9001335 | | 2/1990 |
| WO | 9117672 | | 11/1991 |
| WO | 9213462 | | 8/1992 |
| WO | 9222215 | | 12/1992 |
| WO | 9302558 | | 2/1993 |
| WO | 9404180 | | 3/1994 |
| WO | 9421284 | | 9/1994 |
| WO | 9503809 | | 2/1995 |
| WO | 9507090 | | 3/1995 |
| WO | 9709448 | | 3/1997 |
| WO | 9716077 | | 5/1997 |
| WO | 9716198 | | 5/1997 |
| WO | 9720577 | | 6/1997 |
| WO | 9819668 | | 5/1998 |
| WO | 9827967 | | 7/1998 |
| WO | 9835566 | | 8/1998 |
| WO | 9854982 | | 12/1998 |
| WO | 9909839 | | 3/1999 |
| WO | 9930576 | | 6/1999 |
| WO | 9945797 | | 9/1999 |
| WO | 9949740 | | 10/1999 |
| WO | 9952511 | | 10/1999 |
| WO | 0006127 | | 2/2000 |
| WO | 0112164 | | 2/2001 |
| WO | WO 01/17365 | A1 | 3/2001 |
| WO | 01/90311 | | 11/2001 |
| WO | 0205652 | | 1/2002 |
| WO | 03045356 | | 6/2003 |
| WO | 03/075676 | | 9/2003 |
| WO | 2004074496 | | 9/2004 |
| WO | WO2004/074496 | A1 | 9/2004 |
| WO | 2004100670 | | 11/2004 |
| WO | 2005070232 | | 8/2005 |
| WO | WO2005/070232 | A1 | 8/2005 |
| WO | WO2005/092116 | A1 | 10/2005 |
| WO | WO2006/007463 | A1 | 1/2006 |
| WO | WO2006/122196 | A2 | 11/2006 |
| WO | WO2006/124675 | A2 | 11/2006 |
| WO | WO2006/124675 | A3 | 11/2006 |
| WO | WO2006/127424 | A2 | 11/2006 |
| WO | WO2006/127424 | A3 | 11/2006 |
| WO | WO2006/130738 | A2 | 12/2006 |
| WO | WO2006/133472 | A1 | 12/2006 |
| WO | WO2007/048104 | A1 | 4/2007 |
| WO | WO2007/056686 | A1 | 5/2007 |
| WO | WO2007/060539 | A2 | 5/2007 |
| WO | WO2007/093619 | A1 | 8/2007 |
| WO | WO2007/126990 | A2 | 11/2007 |
| WO | 2007137808 | | 12/2007 |
| WO | WO2008/019887 | A2 | 2/2008 |
| WO | 2011138763 | | 11/2011 |

OTHER PUBLICATIONS

Holthaus, Durchdrückverpackung Translation of DE 102 17 970, Nov. 2003.*

PCT International Search Report Dated Sep. 21, 2009—4 pgs.

USPTO Prosecution History (Office Actions) for U.S. Appl. No. 09/950,052, filed Sep. 12, 2001, 158 pgs.

USPTO Prosecution History (Office Actions), for U.S. Appl. No. 10/842,300, filed May 10, 2004, 89 pgs.

USPTO Prosecution History (Office actions) for U.S. Appl. No. 11/313,198, filed Dec. 20, 2005, 90 pgs.

USPTO Prosecution History (Office actions) for U.S. Appl. No. 11/313,199, filed Dec. 20, 2005, 111 pgs.

USPTO Prosecution History (Office actions) for U.S. Appl. No. 12/012,317, filed Feb. 1, 2008, 262 pgs.

USPTO Prosecution History (Office actions) for U.S. Appl. No. 12/082,710, filed Apr. 14, 2008, 221 pgs.

USPTO Prosecution History (Office Actions) for U.S. Appl. No. 12/168,400, filed Jul. 7, 2008, 297 pgs.

USPTO Prosecution History (Office Actions, Notice of Allowance, Issue Fee Notification) for U.S. Appl. No. 12/371,101, filed Feb. 13, 2009, 187 pgs.

USPTO Prosecution History. (Office Actions) for U.S. Appl. No. 12/371,266, filed Feb. 13, 2009, 123 pgs.

USPTO Prosecution History (Office Actions, Notice of Allowance, Issue Notification) for U.S. Appl. No. 12/638,128, filed Dec. 15, 2009, 178 pgs.

USPTO Prosecution History (Office Actions, Notice of Allowance, Issue Notification) for U.S. Appl. No. 12/716,533, filed Mar. 3, 2010, 197 pgs.

USPTO Prosecution History (Office Actions) for U.S. Appl. No. 12/762,539, filed Apr. 19, 2010, 329 pgs.

USPTO Prosecution History (Office Actions) for U.S. Appl. No. 12/939,594, filed Nov. 4, 2010, 290 pgs.

USPTO Prosecution History (Office Actions) for U.S. Appl. No. 13/098,741, filed May 2, 2011, 109 pgs.

USPTO Prosecution History (Office Actions) for U.S. Appl. No. 13/098,756 filed May 2, 2011, 96 pgs.

USPTO Prosecution History (Office Actions) for U.S. Appl. No. 14/043,142 filed Oct. 1, 2013, 109 pgs.

Amendment in response to Nonfinal Office Action mailed Aug. 16, 2011 and issued in connection with U.S. Appl. No. 12/716,540 dated Nov. 15, 2011, 12 pp.

Amendment in response to Nonfinal Office Action mailed Jun. 10, 2011 and issued in connection with U.S. Appl. No. 12/638,101, Dated Sep. 2, 2011, 35 pp.

Amendment in response to Nonfinal Office Action mailed Jun. 7, 2011 and issued in connection with U.S. Appl. No. 12/716,518 dated Oct. 7, 2011, 29 pp.

Amendment in response to Nonfinal office Action mailed Jun. 9, 2011 and issued in connection with U.S. Appl. No. 12/716,562, dated Sep. 2, 2011, 32 pp.

Archived pages from HTTP://web.archive.org for http://medtechnologies.com dated Feb. 2003, 6 pp.

Blue Buffalo Life Protection Formula_package.pdf, http//www.bluebuff.com/products/dogs/lp-adult-chick.shtml Information accessed Feb. 3, 2009, 4 pp.

Breeders Choice, AvoDERM product brochures http://www.breeders-choice.com/about/brochures.htm, Information accessed Feb. 3, 2009, 20 pp.

Dorland's Pocket Medical Dictionary (24th ed.), W.B. Saunders Co. p. 15, 1989.

European Search Report Received in Connection with EP 04 81 5182, mailed on Jun. 13, 2008, 4 pp.

European Search Report Received in Connection with EP 04 81 5186, mailed on Jan. 7, 2013, 3 pp.

Final Office Action issued in connection with U.S. Appl. No. 12/638,101, mailed Dec. 30, 2011, 26 pp.

Final Office Action issued in connection with U.S. Appl. No. 12/716,518 mailed Jan. 4, 2012, 21 pp.

Final Office Action issued in connection with U.S. Appl. No. 12/716,540 mailed Jan. 10, 2012, 23 pp.

Final Office Action issued in connection with U.S. Appl. No. 12/716,562 mailed Dec. 29, 2011, 23 pp.

International Search Report for PCT/US2011/058861, dated Feb. 10, 2012, 4 pp.

International Search Report for PCT/US2012/035921, dated Jul. 10, 2012, 4 pp.

International Search Report for PCT/US2012/036035, dated Jul. 11, 2012, 3 pp.

(56) References Cited

OTHER PUBLICATIONS

International Search Report Received in Connection with PCT/IB2008/050382, mailed on Oct. 7, 2008, 6 pp.
International Search Report Received in Connection with PCT/US2004/043068, mailed on Sep. 25, 2007, 3 pp.
Natures Logic Natural Chicken Dinner Fare Frozen_package.pdf http://www.natureslogic.com/products/dp_rf_chi.html, Information accessed Feb. 3, 2009, 1 p.
Natures Logic Natural Chicken Meal_package.pdf http://www.natureslogic.com/products/dp_dry_chi.html, Information accessed Feb. 3, 2009, 4 pp.
Nonfinal Office Action issued in connection with U.S. Appl. No. 12/638,101, mailed Jun. 10, 2011, 31 pp.
Nonfinal Office Action issued in connection with U.S. Appl. No. 12/716,540, mailed Aug. 16, 2011, 32 pp.
Nonfinal Office Action issued in connection with U.S. Appl. No. 12/716,562, mailed Jun. 9, 2011, 25 pp.
Nonfinal Office Action issued in connection with U.S. Appl. No. 12/716,518 mailed Jun. 7, 2011, 26 pp.
Publication downloaded from http://en.wikipedia.org/wiki/Noni on May 4, 2009, 9 pages.
Supplemental Amendment in response to Nonfinal Office Action mailed Jun. 10, 2011, and issued in connection with U.S. Appl. No. 12/638,101, dated Sep. 29, 2011, 3 pp.
LabScan XE User's Manual, Manual Version 1.2, A60-1010-862, Jan. 2003, 53 pp.
"A Balanced Diet", Waltham Book of Dog and Cat Nutrition, Ed. ATB, Edney, Chapter by A. Rainbird, pp. 57-74, Pergamon Press, Oxford, 1988.
"Changing Times", The Kiplinger Magazine, vol. 31, No. 1, Jan. 1977, pp. 39-40.
Kidney Stones in Adults (http://kidney.niddk.nih.gov, pp. 1-14), retrieved Dec. 12, 2005.
"*Lactobacillus animalis* genes for 165-23S intergenic spacer region, 23S ribosomal RNA, strain", Database EMBL: JCM 5670, Jul. 9, 2004, XP002447038, 2 pp.
"*Lactobacillus murinus* genes for 165-235 intergenic spacer regions, 23S ribosomal RNA, strain: JCM 1717", Database EMBL, Jul. 9, 2004, XP002447039, 2 pp.
"Mice and Rats", (www.petswarehouse.com, pp. 1-5), retrieved Dec. 12, 2005.
"Nutrient Profiles for Dog Foods", Association of American Feed Control Officials Incorporated, pp. 110-119, 1994.
"Probiotic Basics", (www.usprobiotics.org.basics/, p. 1-12), retrieved Dec. 12, 2005.
"Urinary Tract Infections in Adults", (http://kidney.niddk.nih.gov, pp. 1-11), retrieved Dec. 12, 2005.
Adeyemi, et al., "Analgesic and Anti-Inflammatory Effects of the Aqueous Extract Leaves of Persea America Mill (*Lauraceae*)", Fitoterapia, IDB Holdings, Milan, IT, vol. 73, No. 5, Aug. 1, 2002, pp. 375-380, XP002318086.
Alves-Filho, Drying Technology, 2002, vol. 20, No. 8, pp. 1541-1557, abstract.
Anand, et al., "Cytokines and Inflammatory Bowel Disease", Tropical Gastroenterology, 1999, 20(3), pp. 97-106.
Anderson, et al., Nutrition Reviews, vol. 61, No. 5, pp. S17-S26, May 2003.
Andus, et al., "Imbalance of the Interleikin 1 System in Colonic Mucosa-Association with Intestinal Inflammation and Interleukin 1 Receptor Agonist Genotype 2", Gut, vol. 31, 1997, pp. 651-657.
Anonymous, "The Best Ever Guacamole—Again, Whole Foods Market", Jan. 18, 2013, Retrieved from the Internet: URL:http://www.wholefoodsmarket.com/blog/best-ever-guacamole-again, p. 3.
Apgar, et al., "Effect of feeding Various Levels of Bifidobacterium globosum A on the Performance, Gastrointestinal Measurements and Immunity of Weanling Pigs and on the Perfromance and Carcass Measurements of Gorwing-Finishing Pigs", J. Animal Science, 1993, Vo. 71, pp. 2173-2179.
Appelboom, et al., "Symptoms Modifying Effect of Avocoda/Soybean Unsaponfiables (ASU) in Knee Arthritis. A Double Blind, Prospective, Placebo-Controlled Study", Scandinavian Journal of Rheumatology, vol. 30, pp. 242-247 (2001).
Arai, et al., "Cytokines: Coordinates of Immune and Inflammatory Responses", Annu. Rev. Biochem., 1990, 59: pp. 783-836.
Aranda, et al., "Analysis of Intestinal Lymphocytes in Mouse Colitis Medicated by Transfer of CD4+, CD45RB High T Cells in SCID Recipients", 1997, The American Assoc. of Immunologists, pp. 3464-3473.
Arany, et al., "The Effect of Carcinogens and Non-Carcinogens on Some Biochemical Features of the Mouse Lung Tissue", Arch. Toxicol., Suppl. 4, p. 73 (1980).
Asahara, et al., "Antimicrobial Activity of Intraurethrally Adminstered Probiotic *Lactobacillus casei* in a Murine Model of *Escherichia coli* Urinary Tract Infection", Antimicrobial Agents & Chemotherapy, 2001, 45(6): pp. 1751-1760.
Ashcroft, et al., "Glucose Metabolism in Mouse Pancreatic Islets", Biochem. J. (1970), 118, pp. 143-154.
Au, et al., "Avocado Soybean Unsaponifiables (ASU) suppress TNF-a, IL-1b, cox-2, iNOS Gene Expression, and Prostaglandin E2 and Nitric Oxide Production in Articular Chondrocytes and Monocyte/Macrophages", Osteoarthritis and Cartilage, 2007, 15, 18 pages.
Balkau, et al., "Insulin resistance: an independent risk factor for cardiovascular disease?", Diabetes Obes. Metab., 1 (Suppl. 1), pp. S23-S31, 1999.
Barbara, et al., "A Role for Inflammation in Irritable Bowel Syndrome", Gut, 2002, 51 (Suppl I), pp. i41-i44.
Barge, "Avocados May Help Prevent Oral Cancer, OSU Study Shows", Journal of Dental Hygiene, vol. 82, No. 2, Apr. 2008, 3 pp.
Barrows, et al., "Diet and Nutrition", Walleye Culture Manual, R. C. Summerfelt, editor, NCRAC Culture Series 101, North Central Regional Aquaculture Center Publications Office, Iowa State University, Ames, First Edition, 1996, 9 pp.
Begbie, et al., "The Isolation of Some Heptoses, Heptuloses, Octuloses and Nonuloses from Pimula Officinalis JACQ", Carbohydrate Research, 1966, vol. 2, pp. 272-288.
Benno, et al., "Individual and Seasonal Variations in the Composition of Fecal Microflora of Beagle Dogs", Bifidobacteria Microflora, vol. 11, No. 2, pp. 69-76, 1992.
Biavati, et al., "Electrophoretic Patterns of Proteins in the Genus *Bifidobacterium* and Proposal of Four New Species", Journal Int. J. Syst. Bacteriol., vol. 32, pp. 358-373, 1982.
Blatherwick, et al., "Metabolism of D-Mannoheptulose. Excretion of the Sugar After Eating Avocado", J. Biol. Chem., vol. 133, pp. 643-650 1940.
Board, et al., "High KM Glucose Phosphorylating (Glucokinase) Activities in a Range of Tumor Cell Lines and Inhibition of Rates of Tumor Growth by the Specific Enzyme Inhibitor Mannoheptulose", Cancer Research, vol. 55, pp. 3278-3285, Aug. 1995.
Bodmeier, "Capsule with Controlled Active Ingredient Release Comprises Active Ingredient Containing Filling, Capsule Shell, Swelling Agent and Water-Insoluble Layer", Bodm, May 18, 1999, 1 p.
Botterweck, et al., "Intake of Butylated Hydroxyanisole and Butylated Hydroxytoluene and Stomach Cancer Risk: Results from Analyses in the Netherlands Cohort Study", Food and Chemical Toxicology, 38 (2000, 599-605.
Bouhnik, et al., "Effects of Bifidobacterium SP Fermented Milk Ingested with or without Inulin on Colonic Bifidobacteria and Enzymatic Activities in Healthy Humans", European Journal of Clinical Nutrition, 1996, 50, pp. 269-273.
Brai, et al., "Hypoglycemic and Hypocholesterolemic Potential of Persea Americana Leaf Extracts", J. Med. Food, 2007, pp. 356-360.
Brandtzaeg, et al., "Immunopathology of Human Inflammatory Bowel Disease", Springer Seminars in Immunopathology, 1997, 18, pp, 555-589.
Bredif, et al., "Avocado Sugars are Effective Inducer of Cutaneous Defensive Functions", Journal of the American Academy of Dermatology, St. Loius, Mo, vol. 50, No. 2, Feb. 1, 2007, p. AB84, XP005937005.

(56) References Cited

OTHER PUBLICATIONS

Bridigidi, et al., "Specific Detection of Bifidobacterium Strains in a Pharmaceutical Probiotic Product and in Human Feces by Polymerase Chain Reaction", System Appl. Microbiol., 23, 2000, 391-399.
Brown, et al., "Glucose Phosphorylation is Essential for the Turnover of Neutral Lipid and the Second Stage Assembly of Triacylglycerol-Rich ApoB-Containing Lipoproteins in Primary Hepatocyte Cultures", American Heart Association, Inc., 1999, pp. 321-329.
Burger, et al., "Cardiomyopathy in Ostriches (*Struthio camelus*) Due to Avocado (*Persea Americana* Var. *Guatemalensis*) Intoxication", Journal of the South African Veterinary Association, vol. Jaargang 65, No. 2, pp. 113-118, Jun. 1994.
Campieri, et al., "Reduction of Oxaluria after an Oral Course of Lactic Acid bacteria at High Concentration", Kidney International (2001) vol. 60, pp. 1097-1105.
Carranza, et al., "Lower Quantities of Avocado as Daily Source of Monounsaturated Fats: Effect on Serum and Membrane Lipids, Endothelial Function, Platelet Aggregation and C-Reactive Protein in Patients with Metabolic Syndrome", Database Embase, Elsevier Science Publishers, Amsterdam NL, Nov. 2004, XP002485347, 2 pp.
Chadwick, et al., "Activation of the Mucosal Immune System in Irritable Bowel Syndrome", Gastroenterology, 2002, 122, pp. 1778-1783.
Chan, et al., "Ultra Structural and Secretory Heterogeneity of fa/fa (Zucker) Rat Islets", Molecular and Cellular Endocrinology, 136, 1998, pp. 119-129.
Charteris, et al., "Antibiotic Susceptibility of Potentially Probiotic Bifidobacterium Isolates from the Human Gastrointestinal Tract", Letters in Applied Microbiology, 1998, vol. 26, pp. 333-337.
Charteris, et al., "Development and Application of an In Vitro Methodology to Determine the Transit Tolerance of Potentially Probiotic *Lactobacillus* and *Bifidobacterium* Species in the Upper Human Gastrointestinal Tract", Journal of Applied Microbiology, 1998, vol. 84, pp. 759-768.
Charteris, et al., "Effect of Conjugated Bile Salts on Antibiotic Susceptibility of Bile Salt-Tolerant *Lactobacillus* and *Bifidobacterium* Isolates", Journal of Food Protection, vol. 63, No. 10, 2000, pp. 1369-1376.
Charteris, et al., "Selective Detection, Enumeration and Identification of Potentially Probiotic *Lactobacillus* and *Bifidobacterium* Species in Mixed Bacterial Populations", International Journal of Food Microbiology, 35, 1997, pp. 1-27.
Chauviere, et al., "Adhesion of Human *Lactobacillus acidophilus* Strain LB to Human Enterocyte-like Caco-2 Cells", Journal of General Microbiology, 1992, vol. 138, pp. 1689-1696.
Chen, et al., "Action of 5-Thio-D-Glucose and Its 1-Phosphate with Hexokinase and Phosphoglucomutase", Arch. Biochem. Biophys. 169, pp. 392-396 (1975).
Chevalier, et al., "Detection of *Bifidobacterium* Species by Enzymatic Methods", Journal of Applied Bacteriology, 1990, vol. 68, pp. 619-624.
Chiricolo, et al., "Cell Adhesion Molecules CD11a and CD18 in Blood Monocytes in Old Age and the Consequences for Immunological Dysfunction", Gerontology, 1995, 41(4), pp. 227-234.
Cicco, et al., "Inducible Production of Interleukin-6 by Human Polymorphonuclear Neutrophils: Role of Granulocyte-Macrophage Colony-Stimulating Factor and Tumor Necrosis Factor-Alpha", The American Society of Hematology, Blood, vol. 75, No. 10, May 15, 1990, pp. 2049-2052.
Collins, et al., "A Randomised Controlled Trial of a Probiotic *Lactobacillus* Strain in Healthy Adults: Assessment of its Delivery, Transit and Influence on Microbial Flora and Enteric Immunity", Microbial Ecology in Health and Disease, vol. 14, No. 2, Jun. 2002, pp. 81-89.
Collins, "Probiotics and Man—The Host Microbe Interface", Abstracts, Gastroenterology, vol. 116, No. 4, Apr. 1999, 3 pp.
Kalani, et al., "Effects of Caloric Restriction and Exercise on Age-Related, Chronic Inflammation Assessed by C-Reactive Protein and Interleukin-6", J. Gerontol. A. Bio. Sci. Med. Sci., vol. 61(3), pp. 211-217 (2006).
Kalant, et al., "Effect of Diet Restriction on Glucose Metabolism and Insulin Responsiveness in Aging Rates", Mechanisms of Aging and Development, 46 (1988) 89-104.
Kappler-Tanudyaya, et al., "Combination of Biotransformation and Chromatography for the Isolation and Purification of Mannoheptulose", Biotechnology J. 2007, 2, 692-699.
Katzmarzyk, "The Metabolic Syndrome: An Introduction", Appl. Physiol. Nutr. Metab., 32, pp. 1-3 (2007).
Kaufman, et al., "Identification and Quantification of *Bifidobacterium* Species Isolated from Food with Genus-Specific 16S rRNA-Targeted Probes by Colony Hybridization and PCR", Appl. Environ. Microbiol., Apr. 1997, vol. 63, pp. 1268-1273.
Kealy, et al., "Effects of Diet Restriction on Life Span and Age-Related Changes in Dogs", JAVMA, vol. 220, No. 9, 1315, 1317-1320, May 1, 2002.
Kibenge, et al., "Identification of Biochemical Defects in Pancreatic Islets of fa/fa Rats", Obesity Research, 3(2), pp. 171-178, Mar. 1995.
Klain, et al., "Mannoheptulose and Fatty Acid Synthesis in the Rat", The Journal of Nutrition, pp. 473-477, 1974.
Koh, et al., "Effects of Mannoheptulose on Lipid Metabolism of Rats", J. Nutr., vol. 104, pp. 1227-1233, 1974.
Koizumi, et al., "Influences of Dietary Restriction and Age on Liver Enzyme Activities and Lipid Peroxidation in Mice", American Institute of Nutrition, 361-367, Jul. 1986.
Koizumi, et al., "Influences of Dietary Restriction and Age on Liver Enzyme Activities and Lipid Peroxidation in Mice", J. Nutr., 117: 361-367, 1987.
Kok, et al., "Specific Detection and Analysis of a Probiotic Bifidobacterium Strain in Intact Feces", Applied and Environmental Microbiology, 1996, vol. 62, pp. 3668-3672.
Kudo, et al., "An Electron Microscopic Study on Bifidobacterium Pseudolongum SS-24 with Extracellular Material and Naked Bifidobacterium Thermophilum SS-19", AJAS, vol. 2, No. 3, pp. 444-445, 1989.
Kurata, et al., "Structural Evaluation of Glucose Analogues on Feeding Elicitation in Rat", Metabolism, vol. 38, No. 1 Jan. 1989: pp. 46-51.
Kyoto, "Sustains-Release Formulation which Floats in Stomach—Comprises Core of Fats and Oils, Coated with Drug Containing Layer of e.g., Agar", Kyot, Jul. 10, 1987, 1 p.
La Forge, "Absorption and Effect of Ingested Mannoheptulose", Nutrition Reviews, 1969, vol. 27, No. 7, pp. 206-208.
La Forge, "D-Mannoketoheptose, A New Sugar from the Avocado", J. Biol. Chem. 28:511-22, 1917.
Lab Prod Ethiques Ethypharm, "Coated Microgranules Containing a Gastric Proton Pump Inhibitor with Two Hydrophobic Materials, Free from Alkali and any Ionic Surfactant", Derwent Publications Ltd., Ethi., May 21, 1999, 1 p.
Lakatos, "Immunology of Inflammatory Bowel Diseases", Acta Physiological Hungarica, vol. 87 (4), pp. 355-372, 2000.
Lane, et al., "2-Deoxy-D-Glucose Feeding in Rats Mimics Physiologic Effects of Calorie Restriction", Journal of Anti-Aging Medicine, vol. 1, No. 4, pp. 327-337, 1998.
Lane, et al., "Calorie Restriction in Nonhuman Primates: Implications for Age-Related Disease Risk", Journal of Anti-Aging Medicine, vol. 1, No. 4, pp. 315-326, 1998.
Lane, et al., "Calorie Restriction Lowers Body Temperature in Rhesus Monkeys, Consistent with a Postulated Anti-Aging Mechanisms in Rodents", PNAS, vol. 93, pp. 4159-4164, Apr. 1996.
Langhans et al. "Changes in Food Intake and Meal Patterns Following Injection of D-Mannoheptulose in Rats", Behavioral and Neural Biology, 38, pp. 269-286 (1983).
Leblond-Bourget, et al., "16S rRNA and 16S to 23S Internal Transcribed Spacer Sequence Analysis Reveal Inter-and Intraspecific Bifidobacterium Phylogeny", International Journal of Systemic Bacteriology, vol. 46, No. 1, Jan. 1996, pp. 102-111.

(56) References Cited

OTHER PUBLICATIONS

Leclercq-Meyer, et al., "Effects of D-mannoheptulose and Its Hexaacetate Ester on Hormonal Secretion From The Perfused Pancreas", International Journal of Molecular Medicine, 2000, vol. 6, pp. 143-152.
Lee, "Medicinal Plant Composition Suitable for Each Blood Type", WPI/Thomson, vol. 2004, No. 46, 1 p., Mar. 22, 2004.
Libby, "Inflammatory mechanisms: the molecular basis of inflammation and disease", Nutr. Rev., Dec. 2007, 65 (12 Pt. 2): S140-6.
Liu, et al., "Hass Avocado Carbohydrate Fluctuations. I. Growth and Phenology", J. Amer. Soc. Hort. Sci., 124(6): 671-675, 1999.
Liu, et al., "Hass Avocado Carbohydrate Fluctuations. II. Fruit Growth and Ripening", J. Amer. Soc. Hort. Sci., 124(6): 676-681 (1999).
Liu, et al., "Postulated Physiological Roles of the Seven Carbon Sugars, Mannoheptulose, and perseitol in Avocado", J. Amer. Soc. Hort. Sci., 127(1)108-114, 2002.
Maklashina, et al., "Is Defective Electron Transport at the Hub of Aging", Aging Cell, vol. 3, 21-27, 2004.
Mamula, et al., Gastrointestinal Tract Infections—Chapter 11. 2004, pp. 79-89.
Marteau, et al., "Potential of Using Lactic Acid Bacteria for Therapy and Immunomudulation in Man", FEMS Microbiology Reviews, 12, 1993, pp. 207-220.
Masoro, et al., "Dietary Restriction Alters Characteristics of Glucose Fuel Use", Journal of Gerontology, Biological Sciences, 1992, vol. 47, No. 6, B202-B208.
Masoro, "Overview of Caloric Restriction and Aging", Mech. Aging Dev., vol. 126, pp. 913-922 (2005).
Massi, et al., NCBI Genbank Accession No. AB102854, NCBI Genbank (1994), 1 p.
Mattarelli, et al., "Characterization of the plasmid pVS809 from Bifidobacterium globosum", Microbiologica, 1994, vol. 17, pp. 327-331.
Mattson, et al., "Beneficial Effects of Intermittent Fasting and Caloric Restriction on the Cardiovascular and Cerebrovascular Systems", J. Nutr, Biol. 16, 3:129-137, 2005.
McBrearty, et al., "Probiotic Bifidobacteria and Their Identification Using Molecular Genetic Techniques", Teagasc, Dairy Products Research Centre, Moorepark, Fermoy, Co., Cork, Ireland, Department of Microbiology, University College, Cork Ireland, In, J. Buttriss and M. Saltmarsh (ed), 2000, p. 97-107, Royal Society of Chemistry, Cambridge, United Kingdom.
McCarthy, et al., "Double Blind Placebo Controlled Trial of Two Probiotic Strains in Interleukin 10 Knockout Mice and Mechanistic Link with Cytokine Balance", Gut 2003; 52:975-980.
McCay, et al., "The Effect of Retarded Growth upon the Length of Life Span and upon the Ultimate Body Size", J. Nutr., vol. 10, pp. 63-79 (1935).
McCracken, et al., "Probiotics and the Immune System", In G. W. Tannock (ed.), Probiotics, a critical review. Horizon Scientific Press, Norfolk, United Kingdom, 1999, p. 85-112.
McGee, et al., "A Synergistic Relationship Between TNF-alpha, IL-1B, and TGF-B1 on IL-6 Secretion by the IEC-6 Intertinal Epithelial Cell Line", Immunology, 1995, 86, pp. 6-11.
McKay, et al., "Review Article: In Vitro Models in Inflammatory Bowel Disease", Aliment Pharmacol. Ther., 1997, 11 (suppl. 3), pp. 70-80.
Medaglini, et al., "Mucosal and Systemic Immune Responses to Recombinant Protein Expressed on the Surface of the Oral Commensal Bacterim *Streptococcus gordonil* after Oral Colonization", Proc. Nat. Acad. Sci. USA, vol. 92, pp. 5868-6872, Jul. 1992 Medical Sciences.
Mentula, et al., "Comparison Between Cultured Small-Intestinal and Fecal Microbiotas in Beagle Dogs", Applied and Environmental Microbiology, Aug. 2005, vol. 71, No. 8, p. 4169-4175.
Mermelstein, "Novel Dryer Uses Refractance Window Principle", Food Technology, 51(10), p. 96, 1997.
Meyer, et al., "Long-Term Caloric Restriction Ameliorates the Decline in Diastolic Function in Humans", J. Am. College of Cardiology, vol. 47(2), pp. 398-402 (2006).
Miller, et al., "2-Deoxy-D-Glucose-Induced Metabolic Stress Enhances Resistance to Listeria monocytogenes Infection in Mice", Physiology & Behavior, vol. 65., No. 3, pp. 535-543, 1998.
Miller, et al., "The Metabolic Stressor 2-Deoxy-D-Glucose (2-DG) Enhances LPS-Stimulated Cytokine Production in Mice", Brain, Behavior, and Immunity, 1993, vol. 7, pp. 317-325, 1993.
Mitsuoka, et al., "Ecology of the Bifidobacteria.", The American Journal of Clinical Nutrition, Nov. 1977, vol. 30, pp. 1799-1810.
Mohamed, et al., "Effect of Long-Term Ovariectomy and Estrogen Replacement on the Expression of Estrogen Receptor Gene in Female Rats", Eur. J. Endocrinol., 15, 142:307-14, 2000.
Monteleone, et al., "Manipulation of Cytokines in the Management of Patients with Inflammatory Bowel Disease", Ann. Med, Nov. 2000, 32(8), pp. 552-560.
Morishita Jintan KK, "Capsule Preparation for Enteral Adminstration of Unsaturated Fatty Acids", Derwent Publications Ltd, Mori, Oct. 30, 1997, 1 p.
Morishita Jintan KK, "Yogurt for Supply Physiologically Important Intestinal Bacteria—Contains Bacteria Contained in Capsule Having Inner Layer Made of Digestible Substance and Outer Layer Dissolving in Intestine", Mori, Mar. 10, 1995, 1 p.
Moustafa, et al., "Effects of aging and antioxidants on glucose transport in rat adipocytes", Gerontology, 1995, 41 (6):301-7.
Murphy, et al., "Evaluation and Characterisation of Probiotic Therapy in the CD45RB Transfer Model of Colitis", AGA Abstracts, Gastroenterology, vol. 116, No. 4, Apr. 1999, 1 p.
Naaz, et al., "The Soy Isoflavone Genistein Decreases Adipose Deposition in Mice", Endocrinology, 144 (8):3315-3320, 2003.
Naveh, et al., "Defatted Avocado Pulp Reduces Body Weight and Total Hepatic Fat but Increases Plasma Chloesterol in Male Rats fed Diets with Cholesterol", Am. Soc. for Nutritional Sciences, 2002, 2015-2018.
Nordal, et al., "Isolation of Mannoheptulose and Identification of its Phosphate in Avocado Leaves", J. Am. Chem. Soc., 1954, vol. 76, No. 20, pp. 5054-5055.
Nordal, et al., "Isolation of Mannoheptulose and Identification of its Phosphate in Avocado Leaves", Meddelelser fra Norsk Farmaceutisk Selskap, (1955), 17, 207-213.
Novogrodsky, et al., "Lymphocyte Transformation Induced by Concanavalin A and its Reversion by methyl-alpha-D-mannopyranoside", Biochim. Biophys. Acta, 1971, 228, 579-583.
Obaldiston, et al., "Microflora of Alimentary Tract of Cats", American Journal of Veterinary Research, vol. 32, No. 3, Sep. 1971, pp. 1399-1405.
O'Callaghan, et al., "Differential Cytokine Response of Cells Derived from Different Lymphoid Compartments to Commensal and Pathogenic Bacteria", Gastroenterology, Apr. 2003, vol. 124, Issue 4, Supplement 1, p. A339.
O'Callaghan, et al., "Human Cytokine Production by Mesenteric Lymph Node Cells in Response to Probiotic and Pathogenic Bacteria", Gastroenterology, vol. 111, No. 4, Suppl. 1., pp. A389-S390 DDW Meeting Abstract No. T962, XP09036733, Apr. 2002.
Ogawa, Journal of Japan Mibyou System Association, 2004, vol. 10, No. 1, p. 140-142 (with machine translation), 2004, 140-142.
O'Halloran, et al., "Adhesion of Potential Probiotic Bacteria to Human Epithelial Cell Lines", Departments of Microbiology and Medicine, University College, Mercy Hospital, Cork, Ireland, Dept of Surgery, Mercy Hospital Cork, Ireland, 1998, 1 p.
Ojewole, et al., "Cardiovascular Effects of Persea Americana Mill (*Lauraceae*)(avocado) aqueous Leaf Extract in Experimental Animals", Cardiovasc. J. Afr., 2007, 18, pp. 69-76.
O'Mahony, et al., "Probiotic Bacteria and Pathogenic Bacteria Elicit Differential Cytokine Responses from Dendritic Cells", XP-001097379, Apr. 1, 2001, p. 1625.
O'Mahony, et al., "Probiotic Bacteria and the Human Immune System", Proceedings of the British Nutrition Foundation/Royal Society of Chemistry (Food Chemistry Group) "Functional Foods '99—Claims and Evidence". BNF (London), 2000, pp. 63-70.

(56) References Cited

OTHER PUBLICATIONS

O'Mahony, et al., "Probiotic Human Bifidobacteria: Selection of a New Strain and Evaluation in Vitro and In Vivo", Gastroenterology, vol. 118, No. 4, Apr. 2000, 1 p.
O'Mahony, et al., "Probiotic Impact on Microbial Flora, Inflammation and Tumour Development in IL-10 Knockout mice", Aliment Pharmacol Ther., 2001, 15, pp. 1219-1225.
Panwala, et al., "A Novel Model of Inflammatory Bowel Disease: Mice Deficient for the Multiple Drug Resistance Gene, mdria, Spontaneously Develop Colitis", The American Association of Immunologists, 1998, The Journal of Immunology, 1998, 161, pp. 5733-5744.
Park, et al., "Species Specific Oligonucleotide probes for the detection and identification of Lactobacillus isolated from mouse feces", Journal of Applied Microbiology, 2005, vol. 99, pp. 51-57, XP002447051.
Pawelec, et al., "T Cell Immunosenescence In Vitro and In Vivo", Exp. Gerontol, 1999, 34: 419-429.
Pelicano, et al., "Glycolysis Inhibition for Anticancer Treatment", Oncogene, 2006, 25, pp. 4633-4646.
Perlmann, et al., "Inhibition of Cytotoxicity of Lymphocytes by Concanavalin A in vitro", Science, 1970, 168:1112-1115.
Poehlman, et al., "Caloric Restriction Mimetics: Physical Activity and Body Composition Changes", Journal of Gerontology, Series A 2001, vol. 56A (Special Issue I):45-54.
Powrie, et al., "Inhibition of Th1 Responses Prevents Inflammatory Bowel Disease in Scid Mice Reconstituted with CD45Rbhi CD4+ T Cells", Immunity, vol. 1, pp. 553-562, Oct. 1994.
Purina, "Advancing Life Through Diet Restriction", The Purina Pet Institute Symposium, 2002, 78 pp.
Ramsey, et al., "Dietary Restriction and Aging in Rehesus Monkeys: The University of Wisconsin Study", Experimental Gerontology, 35 (2000) 1131-1149.
Raonimalala, et al., "Action of Soluble Carbohydrates from Avocado Fruit on Utilization of Calcium in the Rat", Ann. Nutr Aliment, 34(4), 734-744, 1980.
Rastall, "Baceria in the Gut: Friends and Foes and How to Alter the Balance", The Journal of Nutrition, Waltham Intl Science Symposium: Nature, Nurture, and the Case for Nutrition (2004), pp. 2022S-2026S.
Reid, et al., "Prevention of Urinary Tract Infection in Rats with an Indigenous Lactobacillus Casei Strain", Infection and Immunity, 1985, 49(2), pp. 320-324.
Rezek, et al., "Glucose Antimetabolites and Hunger", J. Nutr., 106:143-157 (1976).
Rezek, et al., "Insulin Dependence of Paradoxical Overeating: Effect of Mannoheptulose, Somatostatin, and Cycloheximide", The American Physiological Society, 1979, E205-E211.
Ridker, et al., "C-Reactive Protein, the Metabolic Syndrome and Risk of Incident Cardiovascular Events: An 8-Year Follow-up of 14,719 Initially Healthy American Women", Circulation, vol. 107, No. 3, pp. 391-397, Jan. 28, 2003.
Riquelme, et al., "Regulation of Carbohydrate Metabolism by 2,5-Anhydro-D-Mannitol", PNAS, 80, pp. 4301-4305 (1983).
Robey, et al., "Akt, Hexokinase, mTOR: Targeting Cellular Energy Metabloism for Cancer Therapy", Drug Discovery Today: Disease Mechanisms, vol. 2, No. 2, 2005, pp. 239-246.
Rodtong, et al., NCBI Genbank Accession No. AF080100, NCBI Genbank (1998), 1 p.
Roe, et al., "Further Studies of the Physiological Availability of Heptoses", J. Biol. Chem., 121:37-43, 1937.
Roe, et al., "The Utilization of D-Mannoheptulose by Adult Rabbits", J. of Biological Chemistry, 112, 443-449, Jan. 1, 1936.
Rogler, et al., "Cytokines in Inflammatory Bowel Disease", World Journal of Surgery, vol. 22, 1998, pp. 382-389 XP002296948.
Roth, et al., "Caloric Restriction in Primates and Relevance to Humans", Ann. NY Acad. Aci., 928: 305-315, 2001.
Rowland, et al., "Physiological and Behavioral Responses to Glucoprivation in the Golden Hamster", Physiology and Behavior, vol. 30, No. 5, May 1, 1983, pp. 747-747.
Ruscetti, et al., "Release of Colony-Stimulating Activity from Thymus-Derived Lymphocytes", J Clin Invest. 1975;55 (3):520-527.
Sakata, et al., "Feeding Modulation by Pentose and Hexose Analogues", Am. J. Clin. Nutr., 1992, 55:272-277S.
Sayegh, et al., "Impact of Hormone Replacement Therapy on the Body Mass and Fat Compositions of Menopausal Women: A Cross-Sectional Study", Menopause, 6:312-315, 1999.
Scarbrough, et al., "2-Deoxy-D-Glucose and 17-(allylaminio)-17-demethoxygeldanamycin Enhances Toxicity as wella s Increases Parameters Indicative of Oxidative Stress", Free Radical Biology and Medicine, vol. 43, suppl. 1, Nov. 14, 2007, p. S59.
Scardovi, et al., "Deoxyribonucleic Acid Homology Relationships Among Species of the Genus *Bifidobacterium",* Int. J. Syst. Bacteriol., vol. 21, pp. 276-294, 1971.
Yu, et al., "Modulation of Aging Processes by Dietary Restriction", CRC Press, Boca Raton (1994), 45 pp.
Zhang, et al., "Dissimilar Effects of D-Mannoheptulose on the phosphorylation of alpha vs beta-D-glucose by either Hexokinase or Glucokinase", International Journal of Molecular Medicine, 14, pp. 107-112, 2004.
Seikagaku jiten (third edition), Tokyo Kagaku Dojin Publishing Co., Inc., 1998, pp. 657-658.
Collins, et al., "Selection of Probiotic Strains for Human Applications", Dairy Journal, 8, 1998, 487-490.
Conde, et al., "OeMST2 Encodes a Monosaccharide Transporter Expressed throughout Olive Fruit Maturation", Plant Cell Physiol., 48(9), pp. 1299-1308, 2007.
Cooke, et al., "Role of Estrogens in Adipocyte Development and Function", Exp. Biol. Med., 229:1127-35, 2004.
Crane, et al., "The Non-Competitive Inhibition of Brain Hexokinase by Glucose-6-Phosphate and Related Compounds", Biol. Chem., 210, pp. 597-696 (1954).
Cruzen, et al., "Effects of Caloric Restriction on Cardiovascular Aging in Non-Human Primates and Humans", Clin. Geriatr. Med., vol. 25(4), pp. 733-743, Nov. 2009.
Cullen, et al., "Inhibition of Glucose Metabolism in Pancreatic Cancer Induces Cytotoxicity via Metabolic Oxidative Stress", Gastroenterology, vol. 128, No. 4, sup. 2, Apr. 2005, pp. A483, XP002495963.
De Pergola, "The Adipose Tissue Metabolism: Role of Testosterone and Dehydroepiandrosterone", Int. J. Obesity, 24: S59-S63, 2000.
Dent, et al., "Lactobacillus animalis JCM5670", Database JCM Catalogue, Japan Collection of Microorganisms, 1986, XP002447035, 1 p.
Donnelly, et al., "Differential Regulation of Il-1 Production in Human Monocytes by IFN-y and IL-4", The Journal of Immunology, vol. 145, pp. 569-575, No. 2, Jul. 15, 1990.
Dreau, et al., "Effects of 2-deoxy-D-glucose Adminstration on Immune Parameters in Mice", Immunopharmacology, vol. 39, Jun. 1, 1998, pp. 201-213, 1998.
Dunne, et al., "Probiotics: From Myth to Reality, Demonstration of Functionality in Animal Models of Disease and in Human Clinical Trials", Antonie Van Leeuwenhoek. Jul.-Nov. 1999;76(1-4):279-92.
Eisai, "Sustained-Release Solid Preparation of Zero Order Drug Releasing Profile Comprises Granules Obtainable by Coating Inner Core Containing Xanthine Deriv. Etc, with Film of Hardened Oil", Eisa, Dec. 22, 1989, 1 p.
Ekor, et al., "Protective Effect of the Methanolic Leaf Extract of Persea Americana (avocado) Against Paracetamol-induced acute Hepatoxicity in Rats", International Journal of Pharmacology, vol. 2, No. 4, Jan. 1, 2006, pp. 416-420 XP001538905.
Ernst, "Avocado-Soybean Unsaponifiables (ASU) for Osteoarthritis—A systemic Review", Clin. Rheumatol., 2003, 22, pp. 285-288.
Facchini, et al., "Insulin Resistance as a Predictor of Age-Related Diseases", The Journal of Clinical Endocrinology & Metabolism, Aug. 2001, 86(8): 3574-3578.
Fajans, et al., "Stimulation of Insulin Release in the Dog by a Nonmetabolizable Amino Acid. Comparison with Leucine and Arginine", J. of Clinical Endocrinology and Metabolism, 33(1) 35-41, Jul. 1971.

(56) References Cited

OTHER PUBLICATIONS

Favier, et al. "Fecal B-D-Galactosidase Production and Bifidobacteria are Decreased in Crohn's Disease", Digestive Diseases and Sciences, vol. 42, No. 4, Apr. 4, 1997, pp. 817-822.
Fishbein, et al., "Biological Effects of Dietary Restriction", Springer-Verlag, 1991, 6 pp.
Fontana, et al., "Long-term Calorie Restriction is Highly Effective in Reducing the Risk for Artherosclerosis in Humans", PNAS, vol. 101(17), pp. 6659-6663 (2004).
Francesconi, et al., "5-Thio-D-Glucose: Hypothermic Responses in Mice", Am. J. Physiology, 239(3), Sep. 1, 1980, R214-R218.
Frech, et al., "The Utility of Nutraceuticals in the Treatment of Osteoarthritis", Current Rheumatology Reports, 2007, 9, pp. 25-30.
Freund, "Capsule Containing Useful Enteric Bacteria-includes Hydrophobic Layer Non-fluid at Room Temp Isolating Bacteria from Membrane, to prevent Moisture Penetration", Derwent Publ. Ltd. Fren, Aug. 5, 1986, 1 p.
Fujisawa, "Long-Acting Oral Prepn.—comprises Rapidly Soluble Inner Layer and Sustained Release Outer Layer, Both Layers Containing Principal Agent, which is Coronary or Peripheral Vasodilator", Fuji, Sep. 20, 1991, 1 p.
Gallagher, et al., "The Effects of Traditional Antidiabetic Plants on In Vitro Glucose Diffusion", Nutrition Research, 23 (2003), pp. 413-424.
Gartrell, et al., "The Effects of Chocolate and Chocolate by-product Consumption on Wild and Domestic Animals", Chocolate in Health and Nutrition, Humana Press, 2013, pp. 135-141.
Gasche, et al., "IL-10 Secretion and Sensitivity in Normal Human Intestine and Infalmmatory Bowel Disease", Journal of Clinical Immunology, vol. 20, No. 5, 326-370, 2000.
German, et al., "Glucose Sensing in Pancreatic Islet Beta Cells: The Key Role of Glucokinase and the Glycolytic Intermediates", Proc. Nat. Acad. Sci., 90, 1781-1785 (1993).
Gibson, et al., "Dietary Modulation of the Human Gut Microflora Using Probiotics", Journal of Nutrition, 1998, 80, suppl 2, S209-S212.
Gielkens, et al., "Effects of Hyperglycemia and Hyperinsulinemia on Satiety in Humans", Metabolism, vol. 47, No. 3, pp. 321-324, 1998.
Goldrosen, et al., "Impaired Lymphocyte Blastogenic Response in Patients with Colon Adenocarcinoma: Effects of Disease and Age", Journal of Surgical Oncology, 9:229-234, 1977.
Golkar, et al., "Apigenin Inhibits Pancreatic Cancel Cell Proliferation via Down-Regulation of the GLUT-1 Glucose Transporter", Gastroenterology, vol. 130, No. 4, Jul. 22, 2006, 1 p.
Gondwe, "Effects of Persea Americana Mill (*Lauraceae*) Ethanolic Leaf Extract on Blood Glucose and Kidney Function in Streptozotocin-Induced Diabetic Rats and on Kidney Cell Lines of the Proximal (LLC-PK1) and Distal Tubules (MDBK)", Methods Find Exp Clin. Pharmacol., 2008, 30(1), pp. 25-35.
Grajales-Lagunes, et al., "Stability and Sensory Quality of Spray Dried Avocado Paste", Drying Technology, Vo. 17, No. 1&2, 1999, pp. 317-326.
Greetham, et al., "Bacteriology of the labrador dog gut: A cultural and genotype approach", J. Appl. Microbiol., 93:640-646, 2002.
Groux, et al., "Regulatory T Cells and Inflammatory Bowel Disease", Viewpoint Immunology Today, Oct. 1999, 4 pp.
Guo, et al., "In Vivo 2-Deoxyglucose Administration Preserves Glucose and Glutamate Trasport and Mitochondrial Function in Cortical Synaptic Terminals after Exposure to Amyloid Beta-Peptide and Iron: Evidence for a Stress Response", Experimental Neurology, vol. 166., No. 1, Jan. 1, 2000, XP008056810, pp. 173-179.
Hammarstrom, et al., "Mitogenic Leukoagglutinin from Phaseolus vulgaris Binds to a Pentasaccharide Unit in N-acetyllactosamine-type Glycoprotein Glycans", Proc. Natl. Acad. Sci. USA, 79, 1611-1615 (1982).
Hemme, et al., "Lactobacillus murinus JCM1717", Database JCM Catalogue, Japan Collection of Microorganisms, 1982, XP002447036, 1 p.
Henrotin, et al., "Pharmaceutical and Nutraceutical Management of Canine Osteoarthritis: Present and Future Perspectives", The Veterinary Journal, 170 (2005), pp. 113-123.
Hershkovitz, et al., "Ethylene regulation of Avocado Ripening Differs Between Seeded and Seedless Fruit", Postharvest Biology and Technology, vol. 56, No. 2, May 1, 2010, pp. 138-146.
Hildesheim, et al., "Simultaneous Measurement of Several Cytokines Using Small Volumes of Biospecimens", Cancer Epidemiology, Biomarkers & Prevention, vol. IK1, pp. 1477-1484, Nov. 2002, abstract.
Hillsvet, "Hill's Presciption Diet, A New Way to Define Pet Obesity", Internet Article, 2010, http://www.hillsvet.com/conference-documents/Weight_Management/Therapeutic?Weight_Reduction_Program/BFI_Backgrounder.pdf, 2 pp.
Hoffman, et al., "Diabetogenic Action of 5-Thio-D-glucopyranose in Rats", Biochemistry, vol. 7, pp. 4479-4483 (1968).
Hommes, et al., "Anti- and Proinflammatory Cytokines in the Pathogenesis of Tissue Damage in Crohn's Disease", 2000 Lippincott Williams and Wilkins, pp. 1363-1950.
Isolauri, et al., "Probiotics: A Role in the Treatment of Intestinal Infection and Inflammation?", Gut, 2002, 50 (Suppl III), pp. iii54-iii59.
Issekutz, et al., "Effect of Mannoheptulose on Glucose Kinetics in Normal and Glucocorticoid Treated Dogs", Life Sciences, 15(4), pp. 635-643, 1974.
Iwasaki, et al., "Unique Functions of CD11b+, CD8a+ and Double Negative Peyer's Patch Dendritic Cells", 4884-4890, 2001, The American Association of Immunologists.
Jay, et al., "Metabolic Stability of 3-O-Methyl-D-Glucose in Brain and Other Tissues", J. Neurochem., 55, pp. 989-1000 (1990).
Johnson, et al., "Glucose-Dependent Modulation in Insulin Secretion and Intracellular Calcium Ions by GKA50, a Glucokinase Activator", Diabetes, vol. 56, Jun. 2007, pp. 1694-1702.
Johnston, "Small Intestinal Bacterial Overgrowth", The Veterinary Clinics of North America, Small Animal Practice, Mar. 1999, vol. 29, No. 2, Mar. 1999, pp. 523-550.
Almond Pound Cake. Available online at sweetleaf.vilocity.com on Dec. 26, 2006.
Desserts pound cake. Available online at www.en.allexperts.com on Oct. 25, 2005.
International Search Report for PCT/US2009/049467, dated Oct. 28, 2009.
Sample Recipes Available online at http://baking.about.com from Perfect Cakes by Nick Malgieri, 2002.
White Chocolate Mud Cake Recipe. Available online at www.exclusivelyfood.com.au on Jul. 20, 2006.
"Best for Your Pet", Downloaded pages from internet archives, 1 page, dated Apr. 1, 2001, from http://web.archive.org/web/*/http://bestforyourpet.com.
"Wellcheck Puppy Porridge Cereal", Product Alert, vol. 29, No. 17, Sep. 13, 1999.
Englyst, et al., "Simplified Method for the Measurement of Total Non-Starch Polysaccharides by Gas-Liquid Chromatography of Constituent Sugars as Alditol Acetates", Analyst, vol. 109, Jul. 1984, pp. 937-942.
Lahtinen, et al., "Effect of Starch and Lipid-Based Encapsulation on the Culturability of Two Bifidobacterium longum Strains", Letters in Applied Microbiology, vol. 44, Nov. 21, 2006, pp. 500-505.
Lipp, et al., "Review of coca butter and alternative fats for use in chocolate—Part A. Compositional Data", Food Chemistry, 62(1):73-97, 1998.
Playford, et al., "Colostrum and Milk-Derived Peptide Growth Factors for the Treatment of Gastrointestinal Disorders", Am. J. Clin. Nutr., 2000, vol. 72, pp. 5-14.
Puotinen, "Natural Remedies for Dogs and Cats", Keats Publishing, IL, US, 1999, pp. 90-91, 195.
Scardovi, "Irregular Nonsporing Gram-Positive Rods", Genus *Bifidobacterium orla* Jensen, 1924, 472.
Schmitt, et al., "The Immunostimulatory Function of IL-12 in T-Helper Cell Development and its Regulation by TGF-B, IFN-y and IL-4", Chem. Immunet Basel Karger, 1997, vol. 68, pp. 70-85.

(56) References Cited

OTHER PUBLICATIONS

Schrek, et al., "Characterizatoin of the B Lymphocyte Response to Pokeweed Mitogen", Annals of Clinical and Laboratory Science, vol. 12, Issue 6, pp. 455-462 (1982).
Scrimshaw, et al., "Interactions of Nutrition and Infection", Am. J. Med. Sci., 1959, 237: 367-403.
Scruel, et al., "Interference of D-Mannoheptuloase with D-Glucose phosphorylation, Metabolism, and Functional Effects: Comparison between Liver, Parotid Cells and Pancreatic Islets", Molecular and Cellular Biochemistry, 187, pp. 113-120, 1998.
Sener, et al., "D-Mannoheptulose Uptake and Its Metabolic and Secretory Effects in Human Pancreatic Islets", International Journal of Molecular Medicine, 6:617-620, 2000.
Sener, et al., "Environmental Modulation of D-Fructose Insulinotropic Action", Acta Diabetol, 1998, 35, pp. 74-76.
Shanahan, et al., "Genes, Bacteria and T Cells: Ingredients for Inflammatory Bowel Disease", Selected Summaries, Gastroenterology, 1998, 115, pp. 1595-1600.
Shanahan, "The Intestinal Immune System", Physiology of the Gastrointestinal Tract, 3rd. ed., 643-683,1994.
Shaw, et al., "High Performance Liquid Chromatographic Analysis of d-manno-heptulose, perseitol, glucose and Fructose in Avocado Cultivars", J. Agric. Food Chem., 1980, 28, 279-382.
Shimada, "Significance of 1,5-Anhydro-D-Glucitol in Diabetes Mellitus Management", Sangyo Igaku, 1994, 36(3), pp. 448-449.
Silva De Ruiz, et al., "Effect of Lactobacilli and Antibiotics on *E. coli* Urinary Infections in Mice", Biol. Pharm. Bull., 1996, 19(1): 88-93.
Simon, et al., "Insulin and Proinsulin Secretion and Action", Israel J. Med. Sci., vol. 8, No. 6, 743-752, Jun. 1972.
Simon, et al., "Metabolism of Mannoheptulose in the Rat. I. Diabetogenic Action", Arch. Biochem. Biophys., 69, pp. 592-601 (1957).
Simons, et al., "2-deoxy-D-glucose (2DG) Enhances Cispalatin Cytotoxicity in Human Head and Neck Cancer Cells Via Metabolic Oxidative Stress", Free Radical Biology and Medicine, vol. 41, No. 1, Nov. 15, 2006, pp. S112-S113.
Simpson, et al., "Genomic Diversity and Relatedness of Bifidobacteria isolated from a Porcine Cecum", Journal of Bacteriology, Apr. 2003, vol. 185, pp. 2571-2581.
Snow Brand Milk Products, "Enteric Capsules—comprising Core Containg Drug etc. AndCoating of Hardened Oil of M. Pt. Higher than Body Temp and Disintegrated by Lipase in Intestine", Snow, Mar. 31, 1986, 1 p.
Sols, et al., "Substrate Specificity of Brain Hexokinase", Biol. Chem. 210, pp. 581-595 (1954).
Soudeyns, et al., "The Moving Target: Mechanisms of HIV Persistance During Primary Infection", Immunology Today, Oct. 1999, 1 p.
SS Pharmaceutical KK, "Tablets Containing Double-Coated Granules-Obtained by Coating with Insol. Polymer, Enteric Polymer and/or Waces, Then Further Coating with Water or Acid-Soluble Polymer", SSSE, Aug. 18, 1988, 1 p.
Stagg, et al., "The Dendritic Cell: Its Role in Intestinal Inflammation and Relationship with Gut Bacteria", Gut., 2003: 52, 1522-1529.
Stallmach, et al., "Induction and Modulation of Gastrointestinal Inflammation", Trends Immunology Today, Oct. 1998, vol. 19, No. 10, pp. 438-441.
Strober, et al., "Reciprocal IFN-Gamma and TFG-Beta Responses Regulate the Occurrence of Mucosal Inflammation", Immunol. Today, Feb. 18, 1997, 2, pp. 61-64.
Sung, et al., "The Sphincter of Oddi is a Boundary for Bacterial Colonization in the Feline Biliary Tract", Microbial Ecology in Health and Disease, 1990, vol. 3, pp. 199-207.
Sunvold, et al., "Dietary Fiber for Dogs: IV. In Vitro Fermentation of Selected Fiber Sources by Dog Fecal Inoculum and In Vivo Digestion and Metabolism of Fiber-Supplemented Diets", J. Anim. Sci., vol. 73, 1995, 1099-1109.
Sutton, et al., "Considerations for Successful Development and Launch of Personalized Nutrigenomic Foods", Mutation Research, vol. 622, No. 1-2, Aug. 8, 2007, pp. 117-121.
Takayanagi, J. Nippon Med. Sch., 2003, vol. 70, No. 1, p. 71 (with machine translation), 2003, 71.
Takeda Chemical Ind KK, "Dry Coated Tablet—Comprises Core Tablets Containing Enzyme Prepn in Enteric Films Within Outer Shell", Take, May 10, 1982, 1 p.
Tesfay, et al., "Anti-Oxidant Levels in Various Tissues During the Maturation of "Hass" Avocado", Journal of Horticultural Science and Biotechnology, 85(2): 106-112 (2010).
Tomomatsu, "Health Effects of Oligosaccharides", 1994, Food Technology, 48, pp. 61-65.
Trovatelli, et al., "Presence of Bifidobacteria in the Rumen of Calves Fed Different Rations", Appl. Environ. Microbiol., 1976, vol. 32(4), pp. 470-473.
Valente, et al., "Immunologic Function in the Elderly After Injury—The Neutrophil and Innate Immunity", The Journal of Trauma Injury, Infection and Critical Care, vol. 67, No. 5, pp. 968-974, Nov. 2009.
Van Damme, et al., "The Proportion of Th 1 Cells, Which Prevail in Gut Mucosa, is Decreased in Inflammatory Bowel Syndrome", 2001, Blackwell Science Ltd. Clinical and Experimental Immunology, 125, pp. 383-390.
Vasconcelos, et al., "Antagonistic and Protective Effects Against *Salmonella enterica Serovar typhimurium* by *Lactobacillus murinus* in the Digestive Tract of Gnotobiotic Mice", Brazilian Journal of Microbiology (2003) 34 (Supple. 1): 21-24.
Vickers, et al., "Comparison of Fermentation of Selected Fructooligosaccharides and Other Fiber Substrates by Canine Colonic Microflora", AJVR, vol. 62, No. 4, 609-615, Apr. 2001.
Viktora, et al., "Effect of Ingested Mannoheptulose in Animals and Man", Metabolism, 18(2), 87-102, 1969.
Voet, et al., Biochemistry, John Wiley & Sons, Inc., pp. 1044-1045 (1995).
Walker-Bone, et al., "Natural Remedies in the Treatment of Osteoarthritis", Drugs and Aging, 2003, 20(7), pp. 517-526.
Wamelink, et al., "Detection of Transaldolase Deficiency by Quantification of Novel Seven-Carbon Chain Carbohydrate Biomarkers in Urine", J. Inherit. Metab. Dis., (2007), 30, pp. 735-742.
Wan, et al., "Dietary Supplementation with 2-deoxy-d-Glucose Improves Cardiovascular and Neuroendocrine Stress Adaptation in Rats", Am. J. Physiol. Hear. Cir. Physiol, 287: H1186-H1193, 2004.
Wein, et al., "Analyzing a Bioterror Attack on the Food Supply: The Case of Botolinum Toxin in Milk", 2005, The National Academy of Sciences of the USA, vol. 102, No. 28, 9984-9989, 2005.
Weindruch, et al., "The Retardation of Aging and Disease by Dietary Restriction", Charles S. Thomas (1988), 33 pp.
Weindruch, "The Retardation of Aging by Caloric Restriction", Toxicol. Pathol., 1996, 24:742.
Willott, et al., "Aging and Presbycusis: Effects on 2-Deoxy-D-Glucose Uptake in the Mouse Auditory Brain Stem in Quiet", Exp. Neural., vol. 99(3), pp. 615-621 (1988).
Winnock, et al., "Correlation Between GABA Release from Rat Islet beta-cells and their Metabolic State", Am. J. Physiol Endocrinol. Metab., 282: E937-E942, 2002.
Wood, et al., "Evidence for Insulin Involvement in Arginine- and Glucose-Induced Hypercalciuria in Rat", J. Nutr., 113, pp. 1561-1567, 1983.
Yaeshima, et al., "*Bifidobacterium globosum,* Subjective Synonym of *Bifidobacterium pseudolongum,* and Descrption of *Bifidobacterium pseudolongum* subsp. *pseudolongum* com. nov. and *Bifidobacterium pseudolongum* supsp. *globosum* comb. nov.", Systematic and Applied Microbiology, 1992, vol. 15(3), pp. 380-385.
Yamamoto, et al., "Changes in Behavior and Gene Expression Induced by Caloric Restriction in C57BL/6 Mice", Physiological Genomics, vol. 39, No. 3, Sep. 8, 2009, pp. 227-235.
Yang, et al., "The Role of Voltage-Gated Calcium Channels in Pancreatic [beta]-Cell Physiology and Pathophysiology", Endocrine Reviews, vol. 27, No. 6, 621-676, Oct. 1, 2006.

(56) References Cited

OTHER PUBLICATIONS

Yu, "Aging and Oxidative Stress: Modulation by Dietary Restriction", Free Radical Biology and Medicine, vol. 21, No. 5, pp. 651-668, 1996.

* cited by examiner 101
102
103
104
105
106
107
108
109
110
111
112
113
114
115
116
117
118
119
120
121
122
123
124
125

PROBIOTIC SUPPLEMENT, PROCESS FOR MAKING, AND PACKAGING

FIELD

The present invention relates generally to compositions comprising a Probiotic component as a pet food supplement, methods of making the same, and packaging. More particularly, the present invention relates to a pet food composition as a supplement that comprises a Probiotic component, a sweetener component, and a fat component, methods of making the supplement, and packaging of the supplement.

BACKGROUND

Compositions containing Probiotic microorganisms are desirable, especially in the pet food art. While various commercial attempts have been made to achieve such compositions, many of these do not provide sufficient efficacious levels of Probiotic microorganism whether in live or dormant state due to issues associated with susceptibility of the microorganism to standard commercial pet food manufacturing procedures. For example, with pet food compositions in particular, efforts of coating or filling standard pet food kibbles with Probiotic microorganisms have been suggested but, in practice, often prove impractical. To avoid issues associated with standard commercial food manufacture, other manufacturers may provide jars or Probiotic microorganism powder for sprinkling on standard foods. However, this method raises issues of convenience and compliance such that still further development in this area is necessary to achieve an efficacious composition and method of making the same that will be successful in the marketplace and gain widespread human use and use with pets. Furthermore, powder forms of Probiotic microorganisms are not stable enough because as soon as powder forms are exposed to the ambient environment, moisture in the environment promotes premature activation of the Probiotic microorganisms.

Thus, a Probiotic in a very stable form is needed. Moreover, the stable form should be easily administrable such that the consumer is able to administer it to the pet and be sure that the pet is ingesting the Probiotic. Furthermore, the Probiotic microorganisms should be in a controllable amount such that the owner knows that the pet is receiving a specific dose of the Probiotic. Upon ingesting, the Probiotic form should be able to survive in the pet until it reaches and becomes live and active in the gastrointestinal tract.

Therefore, a stable, easily administrable, survivable, and controllable dosing Probiotic composition and process for making the same are needed.

SUMMARY

To address the current needs and improving upon prior technology, the present invention contemplates an article of commerce to deliver a Probiotic supplement for pets, comprising a primary container comprising a blister pack; a supplement comprising a Probiotic component; wherein the supplement is contained within the blister pack. The article of commerce can further comprise a secondary container for containing the primary container. The secondary container can comprise indicia. The indicia can comprise a color that can be associated with a health benefit provided by the supplement. The blister pack can comprise an enclosure. The enclosure can comprise a bottom surface and a body surface, which together define an interior volume for the supplement; a lip disposed around the top of the enclosure; a frill formed between the body surface and the lip; wherein the radius formed by the frill is larger than the radius formed by the lip. The enclosure can comprise a thermoformed plastic.

A system of communicating to a pet owner is also contemplated. The system can comprise a first product comprising a first shape, a first color, and a first health benefit; a second product comprising a second shape, a second color, and a second health benefit; wherein the first product comprises a first Probiotic component; and wherein the second product comprises a second Probiotic component.

An array is also contemplated. The array can comprise a first package comprising a first secondary container housing a first primary container, the first primary container comprising a first blister pack comprising a first enclosure, the first enclosure housing a first supplement comprising a first Probiotic component; a second package comprising a second secondary container housing a second primary container, the second primary container comprising a second blister pack comprising a second enclosure, the second enclosure housing a second supplement comprising a second Probiotic component. The first supplement can provide a first health benefit to a companion animal, and the second supplement can provide a second health benefit to an animal. The first health benefit and the second health benefit can comprise the same or different health benefits. The first secondary container can comprise a first indicia, the second secondary container can comprise a second indicia, wherein the first indicia and the second indicia comprise the same indicia. The first Probiotic component and the second Probiotic component can comprise the same or different Probiotic components.

An article of commerce is also contemplated. The article of commerce can comprise a blister pack comprising a first enclosure and a second enclosure; a first supplement comprising a first Probiotic component housed within the first enclosure; a second supplement comprising a second Probiotic component housed within the second enclosure; wherein the first supplement provides a first health benefit to a companion animal and the second supplement provides a second health benefit to a companion animal. The first health benefit and the second health benefit can comprise the same or different health benefits. The first Probiotic component and the second Probiotic component can comprise the same or different Probiotic components.

An article of commerce is also contemplated. The article can comprise a blister pack comprising an enclosure; a pet food supplement comprising a fat coating; wherein the pet food supplement is housed within the enclosure.

An article of commerce is also contemplated. The article can comprise a package; a blister pack comprising an enclosure; a pet food product; wherein the blister pack is housed within the package; wherein the pet food product is housed within the enclosure; wherein the package has disposed on it a brand name, indicia comprising a color, and a health benefit textual indicia.

Numerous advantages and additional aspects of the present invention will be apparent from the description of the preferred embodiments and drawings that follow.

DETAILED DESCRIPTION

Figure 1:
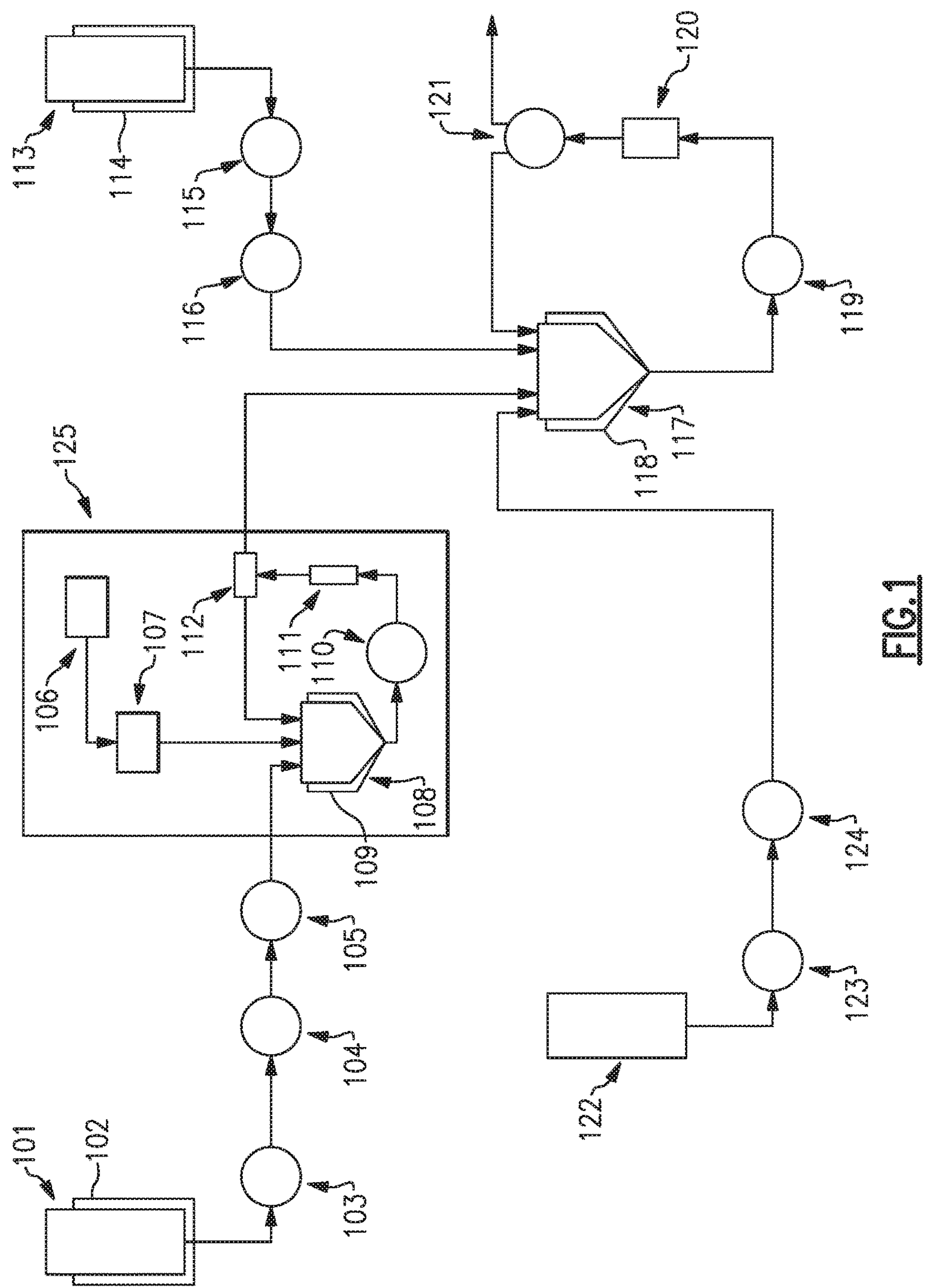
FIG. 1 is a schematic of a process flow of one embodiment of the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended. Such alterations and further modifications in the illustrated device and such further applications of the principles of the invention as illustrated therein as would normally occur to one skilled in the art to which the invention relates are contemplated as within the scope of the invention.

Referenced herein are trade names for components including various ingredients utilized in some embodiments of the present invention. Embodiments of the inventions herein do not intend to be limited by materials under a particular trade name. Equivalent materials (e.g. those obtained from a different source under a different name or reference number) to those referenced by trade name herein may be substituted and utilized in the descriptions herein. Furthermore, referenced herein may be certain brand names of various pieces of equipment used in methods or processing steps. Equivalent pieces of equipments may also be substituted and utilized in the descriptions herein.

Definitions

As used herein, the term "pet" is defined by a domestic animal, including, but not limited to, domestic dogs, cats, horses, cows, ferrets, rabbits, pigs, and the like. Domestic dogs and cats are used in exemplary embodiments of the present invention.

As used herein, the term "viable Probiotic microorganism" or the like is defined by a Probiotic microorganism in its live state, which by definition herein includes, but is not limited to, those in the dormant state and spores.

As used herein, the term "supplement" is defined by a form of a pet food, such as a tablet, capsule, or the like, or other forms such as biscuits, chews, edible films or other treats, which are intended to be used not as entire pet meals but in addition to regularly consumed pet food meals.

The present invention relates to a pet food composition as a supplement that comprises a Probiotic component, a sweetener component, and a fat component, methods of making the same, and packaging for the supplement.

Compositions of the Present Invention

The present invention relates to compositions that may be sufficiently stable such that Probiotic microorganisms are still live or dormant in the compositions at the time of ingestion by a mammal, thereby maintaining activity of the microorganism. The compositions can comprise: (a) a Probiotic component; (b) a sweetener component; and (c) optionally a cocoa butter component.

As discovered herein, it is found that the sweetener component can be useful as a flowing agent to promote processing of the composition. Without the use of the sweetener component, certain problems can arise, including bubbling and unsmooth flowing.

The composition may be of any form that is orally administrable. For example, the composition may be in the form of tablets, capsules, supplements, or the like. Other forms may include powders comprising the Probiotic and sweetener components, for use in combining with foods ordinarily consumed by a mammal.

In one embodiment, the composition is a pet food composition. As used herein, the term "pet food composition," means a composition that is intended for ingestion by the pet. Pet food compositions may include, without limitation, nutritionally balanced compositions suitable for daily feed, as well as supplements (e.g., treats, edible films), which may or may not be nutritionally balanced. As such pet food compositions, or components thereof, may or may not be nutritionally balanced. As used herein, the term "nutritionally balanced," with reference to the pet food composition or a component thereof, means that the composition or component has known required nutrients to sustain life in proper amounts and proportion based on recommendations of recognized authorities in the field of pet nutrition, except for the additional need for water.

Pet food compositions are readily understood in the art to be, for example, dry foods (e.g., at least partially extruded kibbles) and less brittle foods (e.g., semi-moist foods), or mixtures thereof. Pet food compositions may also be supplements, for example, tablets, capsules, or the like, or other forms such as biscuits, chews, edible films or other treats.

The Probiotic component and the sweetener component can be described as follows:

The Probiotic Component

The Probiotic component may comprise one or more yeast or bacterial Probiotic microorganisms suitable for pet consumption and effective for improving the microbial balance in the pet gastrointestinal tract or for another benefit, such as disease or condition relief or prophylaxis, to the pet. Various Probiotic microorganisms known in the art are suitable for use in some embodiments the present invention. See, for example, WO 03/075676, to Societe Des Produits Nestle, published Sep. 18, 2003, and WO 07/126990A2, to Nestec, published Nov. 22, 2007.

The Probiotic component can be any of a number of genera of bacteria. Non-limiting examples of the genera of bacteria include *Bacillus, Bacteroides, Bifidobacterium, Enterococcus* (e.g., *Enterococcus faecium* DSM 10663), *Lactobacillus*, and *Leuconostoc*, and combinations thereof. Those of the genera *Bacillus* may form spores. In one embodiment, the Probiotic component does not form a spore. Non-limiting examples of lactic acid bacteria suitable for use herein include strains of *Streptococcus lactis, Streptococcus cremoris, Streptococcus diacetylactis, Streptococcus thermophilus, Lactobacillus bulgaricus, Lactobacillus acidophilus* (e.g., *Lactobacillus acidophilus* strain DSM 13241), *Lactobacillus helveticus, Lactobacillus bifidus, Lactobacillus casei, Lactobacillus lactis, Lactobacillus plantarum, Lactobacillus rhamnosus, Lactobacillus delbruekii, Lactobacillus thermophilus, Lactobacillus fermentii, Lactobacillus salivarius, Lactobacillus reuteri, Bifidobacterium longum, Bifidobacterium infantis, Bifidobacterium bifidum, Bifidobacterium animalis, Bifidobacterium pseudolongum*, and *Pediococcus cerevisiae*, or mixtures thereof, preferably *Lactobacillus salivarius, Bifidobacterium infantis*, or mixtures thereof.

As a non-limiting example, strains of Bifidobacteria isolated from resected and washed canine gastrointestinal tract as disclosed in U.S. Publication Nos. 2005/0152884; 2005/

0158293; 2005/0158294; and 2005/0175598A1, along with WO05060707A2 can be used. Strains isolated from resected and washed feline gastrointestinal tract may be particularly useful. Non-limiting examples of feline strains that can be used are disclosed in U.S. Publication Nos. 2006/0269534 and 2006/0270020.

In one embodiment, the compositions of the present invention can have a viable Probiotic microorganism count of at least about $10^5$ colony forming units (CFU) per gram of composition, or at least about $10^6$ CFU per gram of composition, or at least about $10^8$ CFU per gram of composition. For example, the composition may have a viable Probiotic microorganism count of up to about $10^{14}$ CFU per gram of composition, up to about $10^{12}$ CFU per gram of composition, or up to about $10^{10}$ CFU per gram of composition, or up to about $10^9$ CFU per gram of composition. CFU is determined using the method provided as part of the European Pharmacopoeial Methods, 2003, Section 2.6.12. Advantageously, the composition provided herein has a shelf life of at least about three months, alternatively at least about six months, alternatively from about three months to about twenty-four months, alternatively from about six months to about eighteen months. As used herein, the term “shelf life” refers to that property of the composition whereby about 1% or more, alternatively about 5% or more, alternatively about 10% or more, alternatively about 25% or more, alternatively about 50% or more, alternatively about 75% or more, of the Probiotic microorganisms of the composition are live viable and active at the referenced time period after exposure to ambient environmental conditions.

As further examples, the compositions may comprise at least about 0.001%, alternatively at least about 0.01%, alternatively at least about 0.1%, alternatively at least about 0.5%, and alternatively at least about 1% of the Probiotic component, by weight of the composition. As further examples, the compositions may comprise about 99% or less, alternatively about 75% or less, alternatively about 50% or less, alternatively about 25% or less, alternatively about 10% or less, and alternatively about 5% or less of the Probiotic component, by weight of the composition.

The Sweetener Component

The compositions herein comprise a sweetener component, which can be found useful as a flowing agent of the composition during processing. Without the use of the sweetener component, certain problems can arise, including bubbling and unsmooth flowing. The sweetener component, as defined herein, can comprise a monosaccharide, disaccharide, or any mixture thereof.

In one embodiment, the compositions herein comprise a monosaccharide. The monosaccharide utilized herein is of the general formula $C_nH_{2n}O_n$, wherein n is an integer equal to or greater than 3. Non-limiting examples of monosaccharides that may be used include sorbitol, mannitol, erythrose, threose, ribose, arabinose, xylose, ribulose, glucose, galactose, mannose, fructose, sorbose, and any mixture thereof. In one embodiment, the monosaccharide may include sorbitol, mannitol, glucose, mannose, fructose, or any mixture thereof. In another embodiment, the monosaccharide is sorbitol.

In one embodiment, the compositions herein comprise a disaccharide. The disaccharide utilized herein is of the general formula $C_nH_{2n-2}O_{n-1}$, wherein the disaccharide has 2 monosaccharide units connected via a glycosidic bond. In such formula, n is an integer equal to or greater than 3. Non-limiting examples of disaccharides that may be utilized herein include sucrose, maltose, lactitol, maltitol, maltulose, lactose, and any mixture thereof. In another embodiment, the monosaccharide is sucrose.

In one embodiment, which may be particularly advantageous to stability of the Probiotic component wherein a sweetener component is utilized, the sweetener component comprises a monosaccharide or disaccharide having a melting point of from about 80 degrees C. to about 140 degrees C., or from about 90 degrees C. to about 120 degrees C. Non-limiting examples include monosaccharides, such as sorbitol or xylitol.

As examples, the compositions herein may comprise at least about 0.001%, or at least about 0.1%, or at least about 1%, or at least about 5%, or at least about 10%, or at least about 20% of the sweetener component, all by weight of the composition. As further examples, the compositions herein may comprise about 99% or less, or about 95% or less, or about 90% or less, or about 75% or less, or about 50% or less of the sweetener component, all by weight of the composition.

Many sweetener components can be used. The sweetener components associated with embodiments of the present invention can also be considered as sources of sweeteners in that they comprise not only a sweetener component but also other components. An example of a sweetener component, or what can be considered a source of a sweetener component, in accordance with one embodiment of the present invention is commercially available from the Blommer Chocolate Company of Chicago, Ill., and is commercially known as Blommer white kreemy coating. The Blommer white kreemy coating comprises a confectioner’s white coating made from a blend of sugar, vegetable oils, nonfat milk powder, lecithin, and artificial color and flavor. More specifically, the Blommer white kreemy coating comprises sugar, partially hydrogenated palm kernel oil, nonfat milk powder, soy lecithin added as an emulsifier, monoglycerides, artificial color in the form of titanium dioxide, and artificial flavor. The Blommer white kreemy coating is generally a complete crystalline solid at 5 degrees C. and begins crystallizing at 18 degrees C. It begins melting at 23 degrees C. and is in complete liquid phase at 38 degrees C. Other white kreemy coatings are available from other manufacturers other than Blommer and can be used as well.

The final pet food composition, which can be in the form of a supplement, can comprise between about 8% and about 10% protein, between about 25% and about 35% fat, between about 1% and 1.5% crude fiber, between about 1% and 3% moisture/water, between about 2% and 3% ash and about $5\times10^{10}$ CFU Probiotic component, all per supplement. The supplement can be of many different sizes and weights.

Optional Components

The present composition may optionally comprise one or more further components, for example an optional component as described herein.

In one embodiment, the compositions may comprise, on a dry matter basis, from about 0.1% to about 30% crude protein, or from about 1% to about 20% crude protein, by weight of the composition. The crude protein material may comprise any material having a protein content of at least about 15% by weight, non-limiting examples of which include vegetable proteins such as soybean, cottonseed, and peanut, animal proteins such as casein, albumin, chicken, beef, pork, lamb, turkey, poultry and meat tissue and bacterial ingredients such as *Lactobacillus, Bifidobacterium, Streptococcus, Enterococcus* and *Bacillus*. Non-limiting examples of meat tissue useful herein include fresh meat, and dried or rendered meals such as fish meal, poultry meal, meat meal, bone meal, and the like. Other types of suitable crude protein sources include wheat gluten or corn gluten, and proteins extracted from microbial sources such as yeast.

The compositions may comprise a source of fat. In one embodiment, the compositions may comprise, on a dry matter basis, from about 0.5% to about 10% fat, from about 2.0% to about 5.0% fat, by weight of the composition. Sources of fat are widely known, and as used herein are interpreted to include (as examples) wax, fat, fatty acid, and/or lipid.

Specific examples of wax, fat, fatty acid, or lipid may often be interchangeable in accordance with nomenclature common in the art; for example, a lipid may often also be characterized as a fat. The inventors herein do not intend to be limited by any particular designation of nomenclature, and classifications of a particular material as a wax, fat, fatty acid, lipid, or the like is made for purposes of convenience only.

For example, the fat may comprise a cocoa butter component. As defined herein the cocoa butter component comprises one or more of cocoa butter, a cocoa butter extender, a cocoa butter replacer, or a cocoa butter substitute. A given fat may be classified as one of a cocoa butter extender, cocoa butter replacer, or cocoa butter substitute, or sometimes may be classified as two or more of a cocoa butter extender, cocoa butter replacer, and cocoa butter substitute. Where used, each of the cocoa butter extender, cocoa butter replacer, and cocoa butter substitute may be one particular fat within the referenced class or any mixtures of such fats.

Cocoa butter is commonly known in the art and may generally refer to the fat from cocoa beans used to prepare chocolate. Cocoa beans are obtainable from the pods of cocoa trees (e.g., *Theobroma cocoa*). Cocoa butter is commercially available from the Blommer Chocolate Company of Chicago, Ill. An example of a cocoa butter available from Blommer comprises their standard cocoa butter. This cocoa butter can be a prime pressed cocoa butter that has been mechanically pressed from properly roasted, winnowed, and milled blended chocolate liquor. Subsequent to pressing, the cocoa butter can be centrifuged to remove any remaining solids. The cocoa butter flavor can then be free from any off odors or off notes. The melting point can be around 30 to 35 degrees C. Furthermore, the water activity of the cocoa butter can be below the required water activity levels to support the growth of microorganisms.

The cocoa butter component may additionally or alternatively comprise a cocoa butter extender. These extenders are also commonly known in the art, and may generally refer to other fats having solid fat index (SFI) profiles which are similar to cocoa butter. Cocoa butter extenders may comprise fat containing $C_{16}$ or $C_{18}$ fatty acids, or combinations thereof. Palm oil, shea oil, illipe butter, mango butter, sal butter, cottonseed oil, and soybean oil, including fractionated and/or partially hydrogenated forms, are non-limiting examples of cocoa butter extenders.

The cocoa butter component may additionally or alternatively comprise a cocoa butter replacer. These replacers will also be commonly known in the art, and may generally refer to fats having melting or other properties, or structures, similar to those of cocoa butter, which are based on non-lauric fats (e.g., $C_{16}$ or $C_{18}$). These include vegetable oils such as palm oil, cottonseed oil, soybean oil, and rapeseed oil, including fractions and/or partially hydrogenated forms thereof. One example is ASTRAL® R (partially hydrogenated vegetable oil (soybean oil and cottonseed oil), commercially available from Humko Oil Products, Cordova, Tenn.).

The cocoa butter component may additionally or alternatively comprise a cocoa butter substitute. These substitutes will also be commonly known in the art, and may generally refer to hard fats having melting or other properties, or structures, similar to those of cocoa butter, but which are based on lauric fats ($C_{12}$). Such cocoa butter substitutes may tend to have melting points higher than that of cocoa butter, making these substitutes interesting for imparting heat resistance to compositions. These include vegetable oils such as palm kernel oil and coconut oil, including fractions and/or partially hydrogenated forms thereof.

In one embodiment, the cocoa butter component comprises at least one lipid selected from the group consisting of soybean oil, cottonseed oil, coconut oil, rapeseed oil, palm kernel oil, fractions of the foregoing, and partially hydrogenated forms of the foregoing.

Alternatively or additionally, the fat may comprise an animal-derived fat component. As will be commonly known in the art, the animal-derived fat component comprises a fat derived from an animal. Non-limiting examples include beef, poultry, pork, and lamb (e.g., lards and tallows). Dairy fats may also be examples, including milkfat, fractionated milkfat, and butterfat.

In one embodiment, the fat may comprise a combination of a cocoa butter component and an animal-derived fat component at a ratio of from about 5:95 to about 95:5, or from about 5:95 to about 25:75, or from about 5:95 to about 50:50, all by weight. In another embodiment herein, the fat comprises the cocoa butter component and the animal-derived fat component at a ratio of from about 20:80 to about 45:55, or from about 25:75 to about 40:60, all by weight.

Alternatively or additionally, the fat may comprise a fatty acid. Illustrative sources include omega-3 or omega-6 fatty acids.

Omega-3-fatty acids are preferably derived from marine (fish) sources, including menhaden (a herring-like fish) and, as such, may be derived from such sources. Non-limiting examples of omega-3-fatty acid sources include docosahexaenoic acid ("DHA") or eicosapentaenoic acid ("EPA"), such as OMEGAPURE, commercially available from Omega Protein, Inc., Houston, Tex. All forms of the fatty acid are also contemplated herein. For example, DHA is often provided as a triglyceride. As such, wherein a specific fatty acid is mentioned (e.g., "DHA"), such fatty acid includes the free form of the fatty acid as well as other forms such as the naturally occurring triglyceride or other form. The terms, DHA, EPA, or other specific terms are utilized for convenience as will be commonly understood in the art to include all forms of such termed material.

Omega-6-fatty acids may be utilized herein. As is well-understood in the art, omega-6-fatty acids are those fatty acid materials having a double bond positioned between the sixth and seventh carbon atoms of the fatty acid chain, when counting from the omega (distal) carbon atom of the chain.

Other examples of suitable fatty acids may include oleic acid, stearic acid, palmitic acid, and lauric acids, including suitable salts thereof. Even further examples of suitable fatty acids include esters or other derivatives thereof, such as cetyl palmitate, acetic, lactic, or citric mono- and di-glyceride fatty acids, isopropyl palmitate, isopropylmyristate, and mono-, di-, and triglycerides (some of which may also be characterized as fats).

The compositions may comprise a mixture of omega-3-fatty acids and omega-6-fatty acids, often through utilization of various materials containing these components. Certain compositions for use herein may be enriched in one or more specific omega-3-fatty acids or omega-6-fatty acids.

Alternatively or additionally, the compositions may comprise wax. For example, illustrative waxes include paraffin wax, beeswax (e.g., white or yellow), carnuba wax, candellila wax, microcrystalline wax, rice bran wax, cetyl ester wax, and emulsifying wax.

Alternatively or additionally, the compositions may comprise a polysaccharide such as shellac, chitin, chitosan or alginate.

The compositions herein may optionally comprise a source of carbohydrate. Grains or cereals such as rice, corn, milo, sorghum, barley, alfalfa, wheat, and the like are illustrative sources of carbohydrate. These carbohydrate sources, and typical levels thereof, are widely known.

The compositions may comprise a component such as dried whey or other dairy by-products.

The compositions may comprise a fermentable fiber. Fermentable fibers are well-known in the art. The fermentable fiber may be any fiber source which intestinal bacteria present in the animal can ferment to produce short chain fatty acids or other metabolic components. Non-limiting examples of such fermentable fibers include beet pulp (from sugar beet), gum arabic, gum talha, psyllium, rice bran, carob bean gum, citrus pulp, pectin, fructooligosaccharide, mannanoligofructose, soy fiber, arabinogalactan, galactooligosaccharide, arabinoxylan, and mixtures thereof.

In general, fermentable fibers are not digested by mammals but may be metabolized by intestinal bacterial species, such as *Bifidobacterium*. However, not all intestinal bacteria can metabolize fermentable fiber. In particular, bacteria such as *Salmonella, E. coli* and *Clostridia* are unable to process such fiber to any meaningful degree. This preferential digestibility, which is applicable for fermentable fiber as a class, can be used to improve the overall bacterial flora in the small intestine of the companion animal. Because fermentable fibers will only feed "good" bacteria such as *Lactobacillus* and *Bifidobacterium*, the amounts of harmful bacteria such as *Salmonella, E. coli* and *Clostridia* may decrease due to a reduction in food resources. Therefore, by providing a preferred food source for beneficial bacterial species, a diet supplemented with fermentable fiber can increase "good" intestinal bacteria while reducing the amount of "bad" bacteria.

Beet pulp and fructooligosaccharide, particularly short chain oligofructose, are particularly preferred fermentable fibers for use herein. As an example, fructooliogosaccharides are naturally occurring compounds which can be found in a variety of fruits or vegetables including banana, barley, garlic, honey, onion, rye, brown sugar, tomato, asparagus, artichoke, wheat, yacon, or chicory. Fructooligosaccharide may for example be provided as chicory root, as a long chain oligofructose (e.g., inulin), or as short chain oligofructose. Particularly useful herein are fructooligosaccharide comprising at least one of 1-kestose (abbreviated as $GF_2$), nystose ($GF_3$), and 1F-beta-fructofuranosylnystose ($GF_4$). While fructooligosaccharides can be extracted from plants such as those mentioned herein, they can also be formed artificially by adding one, two, or three fructose units to a sucrose molecule by a B-(2-1)-glycosidic linkage of the fructose unit(s) to the fructose unit of sucrose. As an example, fructooligosaccharides are commercially available under the tradename NUTRAFLORA from Golden Technologies Company, Incorporated (which is a short chain oligofructose comprising 1-kestose, nystose, and 1F-beta-fructofuranosylnystose). As another example, a mixture of short chain fructooligosaccharide and inulin can be PREBIO1 or a mixture of commercially available RAFTILOSE and RAFTILINE.

The fructooligosaccharide may be a short chain oligofructose, which will be well-known to those of ordinary skill in the art. Particularly useful herein are short chain oligofructose comprising 1-kestose (abbreviated as $GF_2$), nystose ($GF_3$), and 1F-beta-fructofuranosylnystose ($GF_4$). In a preferred embodiment, the short chain oligofructose comprises from about 25% to about 45% 1-kestose, from about 25% to about 45% nystose, and from about 1% to about 20% 1F-beta-fructofuranosylnystose, by weight of the short chain oligofructose, alternatively from about 30% to about 40% 1-kestose, from about 50% to about 60% nystose, and from about 5% to about 15% 1F-beta-fructofuranosylnystose, by weight of the short chain oligofructose. As an example, short chain oligofructose is commercially available under the tradename NUTRAFLORA from Golden Technologies Company, Incorporated (which is a short chain oligofructose comprising about 35% 1-kestose, 55% nystose, and 10% 1F-beta-fructofuranosylnystose, all by weight of the short chain oligofructose).

In an embodiment herein, the fermentable fibers may display certain organic matter disappearance percentages. In this optional embodiment, the fermentable fibers may have an organic matter disappearance (OMD) of from about 15% to about 60% when fermented by fecal bacteria in vitro over a 24 hour period. That is, from about 15% to about 50% of the total organic matter originally present is fermented and converted by the fecal bacteria. The organic matter disappearance of the fibers is alternatively from about 20% to about 50%, alternatively from about 30% to about 40%.

Thus, in vitro OMD percentage may be calculated as follows: $(1-((\text{OM residue}-\text{OM blank})/\text{original OM}))\times 100$, where OM residue is the organic matter recovered after 24 hours of fermentation, OM blank is the organic matter recovered in corresponding blank tubes (i.e., tubes containing medium and diluted feces, but no substrate), and original OM is that organic matter placed into the tube prior to fermentation. Additional details of the procedure are found in Sunvold et al., J. Anim. Sci., Vol. 73, pp. 1099-1109 (1995).

In one embodiment herein, the compositions may comprise at least about 0.25% total fermentable fiber, by weight of the composition. By "total fermentable fiber" it is meant that the referenced level is determined by adding the relative amounts of each fermentable fiber present in the composition. For example, wherein a composition comprises 1% fructooligosaccharide and 0.5% beet pulp, by weight of the composition, and no other fermentable fiber, the composition comprises 1.5% total fermentable fiber, by weight of the composition. Alternatively, the present compositions may comprise at least about 0.5% total fermentable fiber, at least about 1% total fermentable fiber, at least about 2% total fermentable fiber, alternatively from about 1% to about 20% total fermentable fiber, alternatively from about 1% to about 10% total fermentable fiber, alternatively from about 2% to about 10% total fermentable fiber, or alternatively from about 3% to about 8% total fermentable fiber, all by weight of the pet food composition.

In one embodiment herein, the compositions may comprise a nutraceutical. Nutraceutical as used herein means a foodstuff (as a fortified food or dietary supplement) that provides health benefits.

Additional material that can be present in the composition of the present invention include minerals such as but not limited to Calcium Carbonate, Calcium, Boron, Selenium, Calcium Chloride, Chloride, Ferrous Fumarate, Zinc Acetate, Choline Chloride, Chromium, Ferrous Gluconate, Zinc Sulfate, Chromium, Tripicolinate, Cobalt, Magnesium Oxide, Zinc Gluconate, Dicalcium Phosphate, Copper, Magnesium Sulfate, Ferrous Sulfate, Iodine, Magnesium Carbonate, Monosodium Phosphate, Iron, Chromium Picolinate, Potassium Chloride, Magnesium, Calcium Citrate, Potassium Citrate, Manganese, Calcium Lactate, Potassium Sorbate, Phosphorus, Calcium Gluconate, Sodium Bisulfate, Potassium, Chromium Chloride, Sodium Hexametaphosphate, Sodium, Chromium Nicotinate, Tricalcium Phosphate, Zinc, Chromium Citrate, Yeast containing any of these minerals and the like.

Even further additional materials can be present in compositions of embodiments of the present invention. Examples include actives and non-actives. Non-limiting examples include: protein ingredients, of which non-limiting examples include chicken meals, chicken, chicken by-product meals, lamb, lamb meals, turkey, turkey meals, beef, beef by-products, viscera, fish meal, enterals, kangaroo, white fish, venison, soybean meal, soy protein isolate, soy protein concentrate, corn gluten meal, corn protein concentrate, and distillers dried grains solubles; starch ingredients, of which non-limiting examples include cereals, grains, corn, wheat, rice, oats, corn grits, sorghum, grain sorghum, milo, wheat bran, oat bran, amaranth, Durum, and semolina; fiber ingredients, of which non-limiting examples include fructooligosaccharides (FOS), beet pulp, mannanoligosaccharides (MOS), oat fiber, citrus pulp, carboxymethylcellulose (CMC), guar gum, gum arabic, apple pomace, citrus fiber, fiber extracts, fiber derivatives, dried beet fiber (sugar removed), cellulose, α-cellulose, galactooligosaccharides, xylooligosaccharides, and oligo derivatives from starch, inulin, psyllium, pectins, citrus pectin, guar gum, xanthan gum, alginates, gum arabic, gum talha, beta-glucans, chitins, lignin, celluloses, non-starch polysaccharides, carrageenan, reduced starch, soy oligosaccharids, trehalose, raffinose, stachyose, lactulose, polydextrose, oligodextran, gentioligosaccharide, pectic oligosaccharide, and hemicellulose; Other fat ingredients, of which non-limiting examples include poultry fat, chicken fat, turkey fat, pork fat, lard, tallow, beef fat, vegetable oils, corn oil, soy oil, cottonseed oil, palm oil, palm kernel oil, linseed oil, canola oil, rapeseed oil, fish oil, menhaden oil, anchovy oil, and olestra; mineral ingredients, of which non-limiting examples include sodium selenite, monosodium phosphate, calcium carbonate, potassium chloride, ferrous sulfate, zinc oxide, manganese sulfate, copper sulfate, manganous oxide, potassium iodide, and cobalt carbonate; vitamin ingredients, of which non-limiting examples include choline chloride, vitamin E supplement, ascorbic acid, vitamin A acetate, calcium pantothenate, pantothenic acid, biotin, thiamine mononitrate (source of vitamin B1), vitamin B12 supplement, niacin, riboflavin supplement (source of vitamin B2), inositol, pyridoxine hydrochloride (source of vitamin B6), vitamin D3 supplement, folic acid, vitamin C, and ascorbic acid; polyphenols, of which non-limiting examples include tea extract, rosemary extract, rosemarinic acid, coffee extract, caffeic acid, turmeric extract, blueberry extract, grape extract, grapeseed extract, soy extract; amino acids, of which non-limiting examples include 1-Tryptophan, Taurine, Histidine, Camosine, Alanine, Cysteine, Arginine, Methionine, Tryptophan, Lysine, Asparagine, Aspartic acid, Phenylalanine, Valine, Threonine, Isoleucine, Histidine, Leucine, Glycine, Glutamine, Tyrosine, Homocysteine, Omithine, Citruline, Glutamic acid, Proline, and Serine; carotenoids, of which non-limiting examples include lutein, astaxanthin, zeaxanthin, bixin, lycopene, and beta-carotene; antioxidants, of which non-limiting examples include Tocopherols (Vitamin E), Vitamin C, Vitamin A, plant-derived materials, carotenoids (described above), selenium, and CoQ10 (Co-enzyme Q10); fatty acids, of which non-limiting examples include arachidonic acid, alpha-linoleic acid, gamma linolenic acid, linoleic acid, eicosapentanoic acid (EPA), docosahexanoic acid (DHA), and fish oils as a source of EPA and/or DHA; glucose mimetics, of which non-limiting examples include glucose anti-metabolites which include 2-deoxy-D-glucose, 5-thio-D-glucose, 3-O-methylglucose, anhydrosugars including 1,5-anhydro-D-glucitol, 2,5-anhydro-D-glucitol, and 2,5-anhydro-D-mannitol, mannoheptulose, and avocado extract comprising mannoheptulose; other ingredients, of which non-limiting examples include beef broth, brewers dried yeast, egg, egg product, flax meal, DL methionine, amino acids, leucine, lysine, arginine, cysteine, cystine, aspartic acid, polyphosphates such as sodium hexametaphosphate (SHMP), sodium pyrophosphate, sodium tripolyphosphate, zinc chloride, copper gluconate, stannous chloride, stannous fluoride, sodium fluoride, triclosan, glucosamine hydrochloride, chondroitin sulfate, green lipped mussel, blue lipped mussel, methyl sulfonyl methane (MSM), boron, boric acid, phytoestrogens, phytoandrogens, genistein, diadzein, L-carnitine, chromium picolinate, chromium tripicolinate, chromium nicotinate, acid/base modifiers, potassium citrate, potassium chloride, calcium carbonate, calcium chloride, sodium bisulfate; eucalyptus, lavender, peppermint, plasticizers, colorants, flavorants, sweeteners, buffering agents, slip aids, carriers, pH adjusting agents, natural ingredients, stabilizers, biological additives such as enzymes (including proteases and lipases), chemical additives, coolants, chelants, denaturants, drug astringents, emulsifiers, external analgesics, fragrance compounds, humectants, opacifying agents (such as zinc oxide and titanium dioxide), anti-foaming agents (such as silicone), preservatives (such as butylated hydroxytoluene (BHT) and butylated hydroxyanisole (BHA), propyl gallate, benzalkonium chloride, EDTA, benzyl alcohol, potassium sorbate, parabens and mixtures thereof), reducing agents, solvents, hydrotropes, solublizing agents, suspending agents (non-surfactant), solvents, viscosity increasing agents (aqueous and non-aqueous), sequestrants, and keratolytics.

Compositions of embodiments of the present invention may also comprise a prebiotic component. "Prebiotic" includes substances or compounds that are fermented by the intestinal flora of the pet and hence promote the growth or development of lactic acid bacteria in the gastrointestinal tract of the pet at the expense of pathogenic bacteria. The result of this fermentation can be a release of fatty acids, in particular short-chain fatty acids in the colon. This release can have the effect of reducing the pH value in the colon. Non-limiting examples of suitable prebiotics include oligosaccharides, such as inulin and its hydrolysis products commonly known as fructooligosaccharides, galacto-oligosaccarides, xylo-oligosaccharides, or oligo derivatives of starch. The prebiotics may be provided in any suitable form. For example, the prebiotic may be provided in the form of plant material that contains the fiber. Suitable plant materials include asparagus, artichokes, onions, wheat or chicory, or residues of these plant materials. Alternatively, the prebiotic fiber may be provided as an inulin extract, for example extracts from chicory are suitable. Suitable inulin extracts may be obtained from Orafti SA of Tirlemont 3300, Belgium under the trade mark "Raftiline". For example, the inulin may be provided in the form of Raftiline (g) ST which is a fine white powder, which contains about 90 to about 94% by weight of inulin, up to about 4% by weight of glucose and fructose, and about 4 to 9% by weight of sucrose. Alternatively, the fiber may be in the form of a fructooligosaccharide such as obtained from Orafti SA of Tirlemont 3300, Belgium under the trade mark “Raftilose”. For example, the inulin may be provided in the form of Raftilose (g) P95. Otherwise, the fructooligosaccharides may be obtained by hydrolyzing inulin, by enzymatic methods, or by using micro-organisms.

In one embodiment, a pet food supplement comprises a Probiotic component, as described hereinabove, a cocoa butter component, as described hereinabove, and a sweetener component, as described hereinabove. The pet food supplement can comprise about 0.001% to about 10% Probiotic component, about 2 to about 4% cocoa butter component, and about 0% to about 100% sweetener component, including any ranges therebetween for each of the components. Non-limiting examples of particular ranges include about 8% to about 10% of Probiotic component, about 2% to about 4% of cocoa butter component, and about 85% to about 95% of sweetener component.

Processing

The compositions herein may comprise any of a variety of components that are sensitive to process conditions ordinarily attendant with manufacture of a pet food. For example, the integrity of such sensitive components may be preserved (either fully or partially). Non-limiting examples of sensitive components include components that exhibit more than about 10% loss (by weight) during standard extrusion processes when included within a standard, commercial pet food, alternatively more than about 20% loss, alternatively more than about 50% loss. Extrusion processes are well-known in the art. Included or alternative examples of sensitive components including antioxidants such as vitamins including but not limited to vitamin A (including forms thereof, such as beta-carotene and lycopenes), vitamin C (including forms thereof), vitamin E (including forms thereof), vitamin D (including forms thereof), Phenols, Carotenoids, Alkaloids, Xanthones, Polyphenols, Beta-Carotene, OrganoSulfur, Curcumin, Kaempherol, Astaxanthin, Gamma-Glutamylcysteines, Catechins, Pterostilbene, Canthaxanthin, Cysteine Sulfoxides, Ellagic Acid, Quercetin, Tunaxanthin, Isothiocyanates, Baicalin, Tocopherols, Myricetin, Zeaxanthin, Flavonoids, Resveratrol, Anthocyanins, Bixin, Isoflavonoids, Vinpocetine, Flavonols, Lutein, Co-Q10, Proanthocyanidins, Lycopene, Lipoic Acid and the like.

One embodiment of a process for making a pet food supplement in accordance with the compositions disclosed above is described hereinafter and is generally referred to in FIG. 1. FIG. 1 depicts a schematic of a process flow 10, which generally shows one embodiment of a process of making a pet food supplement. In this embodiment, the composition of the supplement can comprise cocoa butter, sweetener in the form of a white coating, one embodiment of which is described hereinabove, and a Probiotic component in the form of Probiotic microorganisms. Initially, cocoa butter can be heated up to around 130 degrees F. and melted in cocoa butter tank 101, which can be a tank with jacket 102 connected to a heat exchanger 103. This heating can be done at least eight hours, or even longer, prior production of the final pet food supplement. Heating at least eight hours or more prior to production helps to remove residual water from the cocoa butter. Jacket 102 can have circulating warm water used to heat up the cocoa butter product in the tank 101. After heating and melting, the heated cocoa butter can then be transported through heat exchanger 103 to cool down the cocoa butter to around 110 degrees F. This cool down to 110 from 130 degrees F. helps to reduce inactivation of the Probiotic microorganisms by the heat of the cocoa butter. Heating to 130 degrees F. can assist in removing moisture from the cocoa butter, which can prevent premature activation of the Probiotics microorganisms. However, 130 degrees F. can be too high for the Probiotics microorganism because it can deactivate the Probiotic microorganism. At 110 degrees F., deactivation of the Probiotic microorganisms will generally not occur, and this temperature allows for a flowable and mixable cocoa butter component. From the heat exchanger 103, the cocoa butter can be transported by means of positive displacement pump 104 through flow meter 105 into mix tank 108. Flow meter 105 helps to control the proper amount of cocoa butter being transported by positive displacement pump 104. Screw pump 106 can be connected to mix tank 108 through flow meter 107. Screw pump 106 doses the quantity of Probiotic microorganism into mix tank 108. Flow meter 107 helps to control the proper amount of Probiotic microorganism into mix tank 108. The Probiotic microorganism can be stored in ajar, bottle, or other container and added to a hopper, which can be connected with the screw pump 106. Mix tank 108 can be a jacketed scrape surface mix tank. This tank can be maintained at around 105 degrees F. with warm water through jacket 109. At 105 degrees F., rather than at 110 degrees F., the Probiotics microorganisms can be stored and kept for longer periods of time. Thus, operating at 105 degrees F. at this point assists to prevent or inhibit any premature inactivation of the Probiotic microorganisms. Mix tank 108 can be the location of the mixing of the Probiotic microorganisms and the heated and melted cocoa butter.

Upon mixing of the cocoa butter and Probiotic microorganisms, the mixture can be transported from the mix tank 108 through pump 110 into mix tank 117. Pump 110 can be a Moyno pump. A Moyno pump can allow for very gentle transportation of the mixture and thus can prevent or inhibit shear, damage, or other physical stress to the mixture and can be used for circulating the cocoa butter and Probiotic microorganism mixture over mix tank 108. Static mixer 111 and three-way valve 112 work together to promote thorough mixing of the cocoa butter and Probiotic microorganism mixture depending on the position of three-way valve 112. Three-way valve 112 can direct the mixture either back into mix tank 108 or into mix tank 117. Clumping of the cocoa butter and microorganism mixture should be avoided, and thus static mixer 111 and three-way valve 112 work together to reduce and attempt to eliminate clumping of the cocoa butter and Probiotic microorganism mixture.

Once the mixture is mostly, if not completely, homogeneous and the Probiotic microorganisms are saturated or fully coated with the cocoa butter, three-way valve 112 can be changed to a position to direct the mixture flow from mix tank 108 into mix tank 117. At this point, however, mix tank 117 can already contain the proper amount of white coating, or sweetener component, and transfer of the mixture of cocoa butter and Probiotic microorganism from mix tank 108 to mix tank 117 should not commence until so, in one embodiment. The sweetener, or white coating, can be pulled from white coating tank 113. White coating tank 113 can have a jacket 114, which can assist in maintaining the tank at 105 degrees F. The white coating can be held at 105 degrees F. for around 24 hours or more prior to mixing it with the cocoa butter and Probiotic microorganism mixture. White coating tank 113 can hold for storage the white coating and can keep it in melted form for mixing with the cocoa butter and Probiotic microorganism mixture. The white coating can be pulled from white coating tank 113 by means of positive displacement pump 115, which can be controlled by flow meter 116 for the correct dosing amount. It has been found that for consistency purposes and for a better end product that it can be advantageous to mix the cocoa butter and Probiotic microorganism mixture into the white coating in mix tank 117. Mix tank 117 can have a jacket 118 and can be a scrape surface mix tank. Mix tank 117 can be maintained at around 100 to 105 degrees F. with warm water flowing through the jacket 118.

A Moyno pump 119 can be included and can be used to circulate the cocoa butter and Probiotic microorganism mixture with the white coating over mix tank 117 to create a combined mixture. Static mixer 120 can be used to promote thorough mixing of the cocoa butter and Probiotic microorganism mixture with the white coating and can be dependent on the position of three-way valve 121.

Once the combined mixture is fully, or sufficiently, homogenous, three-way valve 121 can be switched to a position such that the combined mixture can be transported by Moyno pump 119 away from the mix tank 117 to other equipment that can be used to form the combined mixture into supplement form.

If so desired, colorant can be dosed into mix tank 117 by means of dosing colorant from mix tank 122 by means of positive displacement pump, which can be controlled by flow meter. An all natural colorant can be used. One non-limiting example of a colorant is CSL 37542 Brown Dispersion OB, available from Sensient Colors of St. Louis, Mo. It can also include caramel and paprika. However, it should be understood than any fat soluble colorant can be used, natural or non-natural. As non-limiting examples, the compositions herein may comprise about 0.1%, about 0.2%, about 0.3%, about 0.4%, or about 0% to about 1% colorant, all by weight of the composition.

It should be understood that a conditioned room 125 that is shaded in FIG. 1 can control the temperature and relative humidity of the screw pump 106, the flow meter 107, the mix tank 108, the pump 110, the mixer 111, and the three-way valve 112. Control can be done by arranging all of these items in a conditioned room or chamber. Control of temperature and relative humidity can assist in preventing premature activation of the Probiotic microorganism. In at least one embodiment, the conditioned room 125 can be at around 100 degrees F. and at a relative humidity of about 10% or lower. Once the Probiotic microorganisms are coated with the cocoa butter, the risk of pre-mature activation of the Probiotic microorganism can be dramatically reduced by use of a conditioned room. The conditioned room 125 can also prevent condensation from forming on the Probiotic component.

Figure 2:
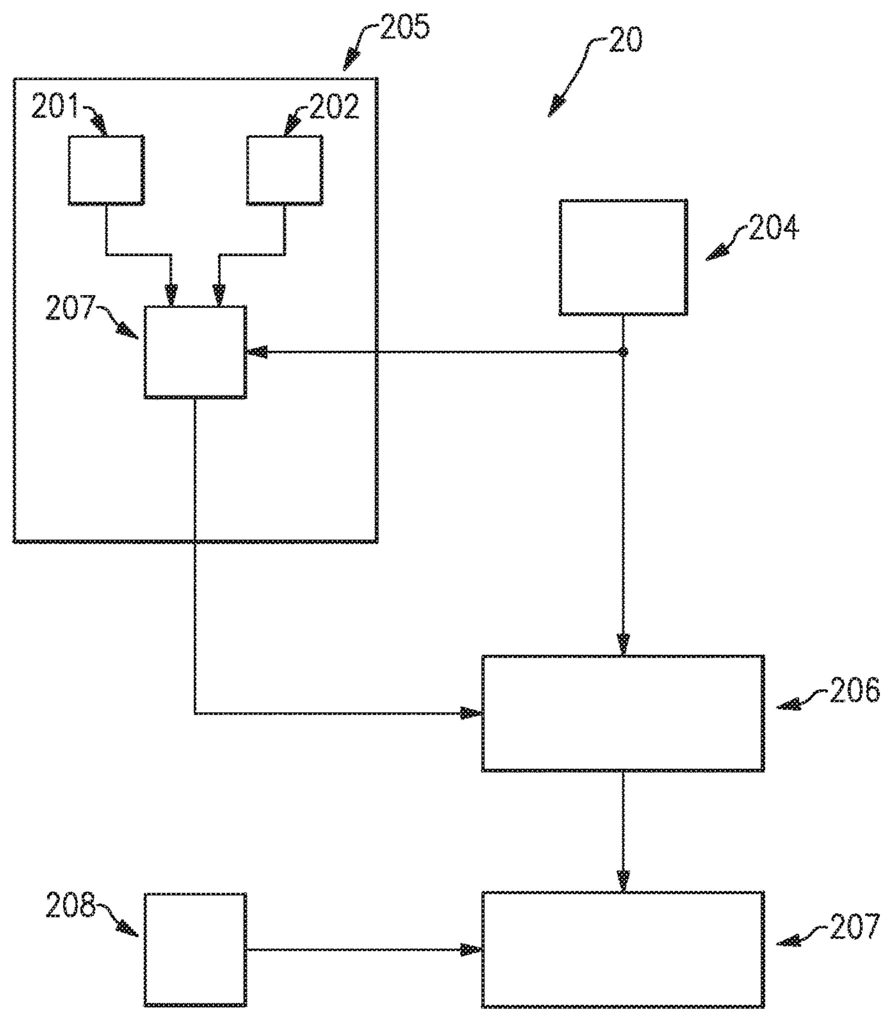
FIG. 2 is a schematic of a process flow of one embodiment of the present invention.

Homogenous mixing of the Probiotic microorganisms in the cocoa butter and with the white coating can be one embodiment. In some instances, problems arise with proper disbursement of the Probiotic microorganisms and the cocoa butter throughout the white coating to form the combined mixture. At least one of those problems is the Probiotic microorganisms not being disbursed in a relatively homogenous fashion throughout the combined mixture. This combined mixture, as describe above, is the Probiotic microorganisms and cocoa butter mixture combined with the white coating. This problem can arise when increased counts of Probiotic microorganisms are used. Specifically, this problem can arise at levels such as $10^{10}$ CFU of the Probiotic microorganisms. One way of addressing this problem associated with proper disbursement of the Probiotic microorganisms in a homogenous fashion throughout the white coating mixture can be to create a two phase process of mixing the white coating with the Probiotic microorganisms and cocoa butter mixture. FIG. 2 is a schematic showing one embodiment of a mixing process 20 than can be used. In this embodiment, the composition of the supplement can comprise cocoa butter, sweetener in the form of a white coating, one embodiment of which is described hereinabove as available from Blommer, and a Probiotic component in the form of Probiotic microorganisms. As before, initially the cocoa butter can heated up to around 130 degrees F. and melted in a cocoa butter tank 201. This heating can be done at least eight hours, or even longer, prior production of the final pet food supplement. Heating at least eight hours or more prior to production helps to remove residual water from the cocoa butter. After heating and melting, the heated cocoa butter can then be transported and cooled down to around 110 degrees F., or 105 degrees F., or even lower. This cool down to 110 or 105 degrees F. from 130 degrees F. helps to reduce inactivation of the Probiotic microorganisms by the heat of the cocoa butter. The cocoa butter can be transported into a mix tank 203. At this point, the appropriate quantity of Probiotic microorganism from tank 202 can be dosed into the mix tank 203 to be mixed with the cocoa butter. The Probiotic microorganism can be variable in granule size. It can range from dusty to particles that can be up to 2 or 3 mm in diameter. The Probiotic microorganism can be derived from a fermentation culturing process where a starter organism is added to a nutrient rich growth media in a liquid (aqua) based environment. After the bacteria mix has grown through the log phase of growth (rapid bacterial growth), the bacterial mix is dried down through a spray drying process. It can then be stored at −4 C. or less. This mix tank 203 can be maintained at around 105 degrees F. Thus, the mix tank 203 can be the location of the mixing of the Probiotic microorganisms and the heated and melted cocoa butter.

At this point, the mixture of the cocoa butter and Probiotic microorganisms can be combined with the white coating to assist in proper disbursement of the Probiotic microorganisms. Such a combination can occur in mix tank 203. As before, clumping of the cocoa butter and microorganism mixture should be avoided, especially prior to addition of the white coating. Thus, mixing of the Probiotic microorganisms and cocoa butter can be done for about five minutes until a smooth or mostly smooth mixture is attained. Once the mixture of Probiotic microorganisms and cocoa butter is without or mostly without clumps, is mostly, if not completely, homogeneous, and the Probiotic microorganisms are saturated or fully coated with the cocoa butter, a first addition of the white coating can be added to the mixture. This first addition of the white can comprise only a portion of the total amount of white coating that will eventually be added to the entire mixture. Again, this first addition can assist in proper disbursement of the Probiotic microorganisms in the final combined mixture. In one embodiment, only about 30% of the total white coating is added to the Probiotic microorganisms and cocoa butter mixture in this first addition. As before, the white coating can be pulled from a white coating tank 204. The white coating tank 204 can be maintained in the white coating tank at about 105 degrees F. and can be held at this temperature for around 24 hours or more prior to mixing it with the cocoa butter and Probiotic microorganism mixture. The mixing that occurs with this first addition of the white coating can occur in mix tank 203. Again, as before, it should be understood that a conditioned room 205 that is shaded in FIG. 2 can control the temperature and relative humidity of at least the mix tank 203. Control can be done by arranging all of these items in a conditioned room or chamber. Control of temperature and relative humidity can assist in preventing premature activation of the Probiotic microorganism. In at least one embodiment, the conditioned room 125 can be at around 100 degrees F. and at a relative humidity of about 10% or lower. Once the Probiotic microorganisms are coated with the cocoa butter, the risk of pre-mature activation of the Probiotic microorganism can be dramatically reduced by use of a conditioned room.

Upon addition of the first addition of the white coating to the mix tank 203 and mixing of the combined mixture of Probiotics microorganisms, cocoa butter, and white coating, a second amount of white coating can be mixed with the combined mixture. Such mixing can occur in mix tank 206. At this point, however, mix tank 206 can already contain the rest of the white coating so that the cocoa butter, Probiotic microorganisms, and first addition white coating can be added to the mix tank 206, which can already contain the white coating. In one embodiment where about 30% of the white coating was used a first addition, as above, the leftover about 70% can be used. The white coating can be pulled from white coating tank 204 into mix tank 206 prior to addition of the cocoa butter, Probiotic microorganisms, and first addition white coating mixture. Again, the white coating tank 204 can be maintained at about 105 degrees F. The white coating can be held at about 105 degrees F. for around 24 hours or more prior to mixing. White coating tank 204 can hold for storage the white coating and can keep it in melted form for mixing. It has been found that for consistency purposes and for a better end product that it can be advantageous to mix the cocoa butter, Probiotic microorganism mixture, and first addition white coating into the white coating in mix tank 206. Mix tank 206 can be maintained at around 100 to 105 degrees F. A pump can be included and can be used to circulate the cocoa butter, Probiotic microorganism, and first addition white coating mixture with the white coating over mix tank 206 to create a combined mixture. The combined mixture can be sent to mix tank 207 and mixed with a colorant, as above, which can be added from tank 208 into the mixture. To assure sufficient mixing of all of the components, one embodiment can include mixing of the components for at least about 20 minutes to form a homogenous mixture. At this point, the mixture can have melting properties such that it is a complete crystalline solid at 0 degrees C., begins crystallizing at 18 degrees C., and begins melting at 25 degrees C., and is in a complete liquid phase at 39 degrees C.

Upon a sufficiently homogenous mixture of the cocoa butter, Probiotic microorganism, white coating, and colorant, if any, the combined mixture can be sent to further processing equipment for making into the desired form of the pet food supplement. In one embodiment, the mixture can be deposited into blister pack trays as part of the overall process. In this embodiment, the blister pack trays comprise any number of thermoformed blister enclosures that can function and can serve as molds for the mixture. The blister pack tray and the enclosures, as described in more detail hereinafter, can comprise any number of shapes, sizes, and configurations to serve any number of functions in completing the pet food supplement manufacturing process and in delivering the pet food supplement to a consumer. As mentioned above, the mixture can be deposited into the thermoformed blister enclosure, which functions as a mold for the mixture. The temperature of the mixture during depositing into the blister enclosure can be around 100 degrees F. The blister pack, enclosure, and deposited mixture then can go through a cooling process that allows the mixture to harden in the enclosure. The cooling process can occur through a cooling tunnel, for example, and can occur at around 60 degrees F. for about seven to twelve minutes. Of course, cooling can be completed at other temperatures and times, and such temperatures and times are dependent on one another. For example, cooling can be done at around 50 degrees F., or even below 50 degrees F., for around five to ten minutes. During this cooling, the mixture will harden and crystallize while in the enclosure mold to form a solid supplement. If the enclosure mold comprises a specific shape, the mixture can harden into that shape. Non-limiting examples of such shapes and forms include round, oval, rectangular, square, triangular, trapezoidal, octagonal, bone, heart, and steak, and are described in further detail hereinafter. After cooling, the enclosure can be sealed with a closure, such as a foil closure that can be rupturable by a consumer using nominal force. Sealing of the closure, with foil, can be completed at the appropriate temperature and dwell time based on the type of material used for the foil and blister pack. At this point, a blister pack with blister enclosures filled with pet food supplements has been manufactured. Once sealed, the blister pack can then be inserted into a secondary container or package, the configuration of which is described hereinafter in more detail.

The above processing allows extremely consistent and controllable dosing through the supplement. By sufficient and homogenous mixing of the multiple components, a controllable amount of Probiotic component can be provided in a single supplement and results in an end product that is consistent, reliable, and dependable in providing a dose of a Probiotic component in a supplement.

Another suitable process for the preparation of pet food compositions can be at least partial extrusion, although baking and other suitable processes may be used. When extruded, the dried pet food is usually provided in the form of a kibble. A process is described in EP 0,850,569.

The packages and supplements of embodiments of the present invention can comprise Probiotic components for use with any of a variety of conditions and/or to achieve a variety of health benefits. The present compositions can be used to deliver a benefit, or benefits, following oral consumption in animals, preferably a pet. This benefit generally maintains and improves the overall health of the animal. Non-limiting elements of animal health and physiology that benefit, either in therapeutically relieving the symptoms of, or disease prevention by prophylaxis, or improvement of overall health, including treatment of the immune system, treatment of the gastrointestinal system, treatment of skin or coat, treatment of stress, and combinations thereof. Non-limiting examples include inflammatory disorders, immunodeficiency, inflammatory bowel disease, irritable bowel syndrome, cancer (particularly those of the gastrointestinal and immune systems), otitis externa, diarrheal disease, antibiotic associated diarrhea, appendicitis, autoimmune disorders, multiple sclerosis, Alzheimer's disease, amyloidosis, rheumatoid arthritis, arthritis, joint mobility, hip dysplasia, diabetes mellitus, insulin resistance, bacterial infections, viral infections, fungal infections, periodontal disease, urogenital disease, idiopathic cystitis, interstitial cystitis, surgical associated trauma, surgical-induced metastatic disease, sepsis, weight loss, weight gain, excessive adipose tissue accumulation, anorexia, fever control, cachexia, wound healing, ulcers, gut barrier infection, allergy, asthma, respiratory disorders, circulatory disorders, coronary heart disease, anemia, disorders of the blood coagulation system, renal disease, disorders of the central nervous system, hepatic disease, ischemia, nutritional disorders, treatment or prevention of disorders involving the hypothalamus-pituitary-adrenal (HPA) axis, osteoporosis, endocrine disorders, and epidermal disorders. Preferred are treatment of the gastrointestinal tract, including treatment or prevention of diarrhoea; immune system regulation, preferably the treatment or prevention of autoimmune disease and inflammation, maintaining or improving the health of the skin and/or coat system, preferably treating or preventing atopic disease of the skin, treatment or prevention of disorders involving the hypothalamus-pituitary-adrenal (HPA) axis, ameliorating or reducing the effects of aging, including mental awareness and activity levels, and preventing weight loss during and following infection.

Other examples of health benefits provided to canines by embodiments of the present invention are disclosed in U.S. Publication Nos. 2005/0152884; 2005/0158293; 2005/0158294; and 20050175598A1; as well as WO05060707A2. Other examples of health benefits provided to felines by embodiments of the present invention are disclosed in U.S. Publication Nos. 2006/0269534; 2006/0270020; 20050175598A1; as well as WO05060707A2. Moreover, methods of the present invention are disclosed in the above publications.

Embodiments of the present invention include packaging for storage, shipment, and display for sale of composition embodiments of the present invention, including the supplement as herein described. Composition embodiments of the present invention can be packaged and sealed in packaging systems that will not absorb fat from the compositions. Additionally, the Probiotic component can have heat sensitization properties. Those properties can result in requiring packaging systems that have the ability to be cold shipped, such as at temperatures less than about 75 degrees F. These factors can be important in determining the types of components used in the packaging of the compositions of the present invention.

With respect to the packaging aspects of embodiments of the present invention, the following definitions can be used.

"Communicate" as used herein means a package or container that conveys information to a consumer about a product, such as a supplement, within the package or container. In one example, the information about the product may be conveyed to a consumer by textual or non-textual indicia.

"Intuitively communicated" as used herein means a package or container and/or the product, such as a supplement, itself that comprises textual or non-textual indicia and conveys information by the indicia that a consumer interprets.

"Indicia" as used herein means an identifier and/or indicator and/or hint and/or suggestion that can be included on a container or a product, such as a supplement, of the nature of a property of something, such as an intensive property of a sanitary tissue product.

"Textual indicia" as used herein means a text indicia, such as a word and/or phrase that communicates to a consumer. Textual indicia can be used to inform the consumer of particular health benefits associated with a supplement. For example, if a joint and mobility health benefit is provided by a supplement, text can be included anywhere on the primary container, secondary container, the supplement itself, or on any other part of the embodiment to communicate the consumer that a joint and mobility health benefit is provided. A non-limiting example of such textual indicia can be the words "Joint Mobility" written on the secondary container and viewable by a consumer. Any other kind or form of textual indicia to communicate a health benefit is contemplated.

"Brand name" as used herein means a single source identifier, in other words, a brand name identifies a product and/or service as exclusively coming from a single commercial source (i.e., company). An example of a brand name is Iams™, Brand names are nonlimiting examples of textual indicia. The supplements of the present invention may be marketed and/or packaged under a common brand name (i.e., the same brand name, such as Iams™.

"Non-textual indicia" as used herein means non-text indicia that communicates to a consumer through a consumer's senses. In one example, a non-textual indicia may communicate, even intuitively communicate, to a consumer through sight (visual indicia).

Non-limiting examples of non-textual indicia include colors, textures, patterns, such as emboss or deboss patterns and/or emboss or deboss pattern images, character representations, action representations, and mixture thereof.

"Color" as used herein means a visual effect resulting from a human eye's ability to distinguish the different wavelengths or frequencies of light. The apparent color of an object depends on the wavelength of the light that it reflects.

Figure 3A:
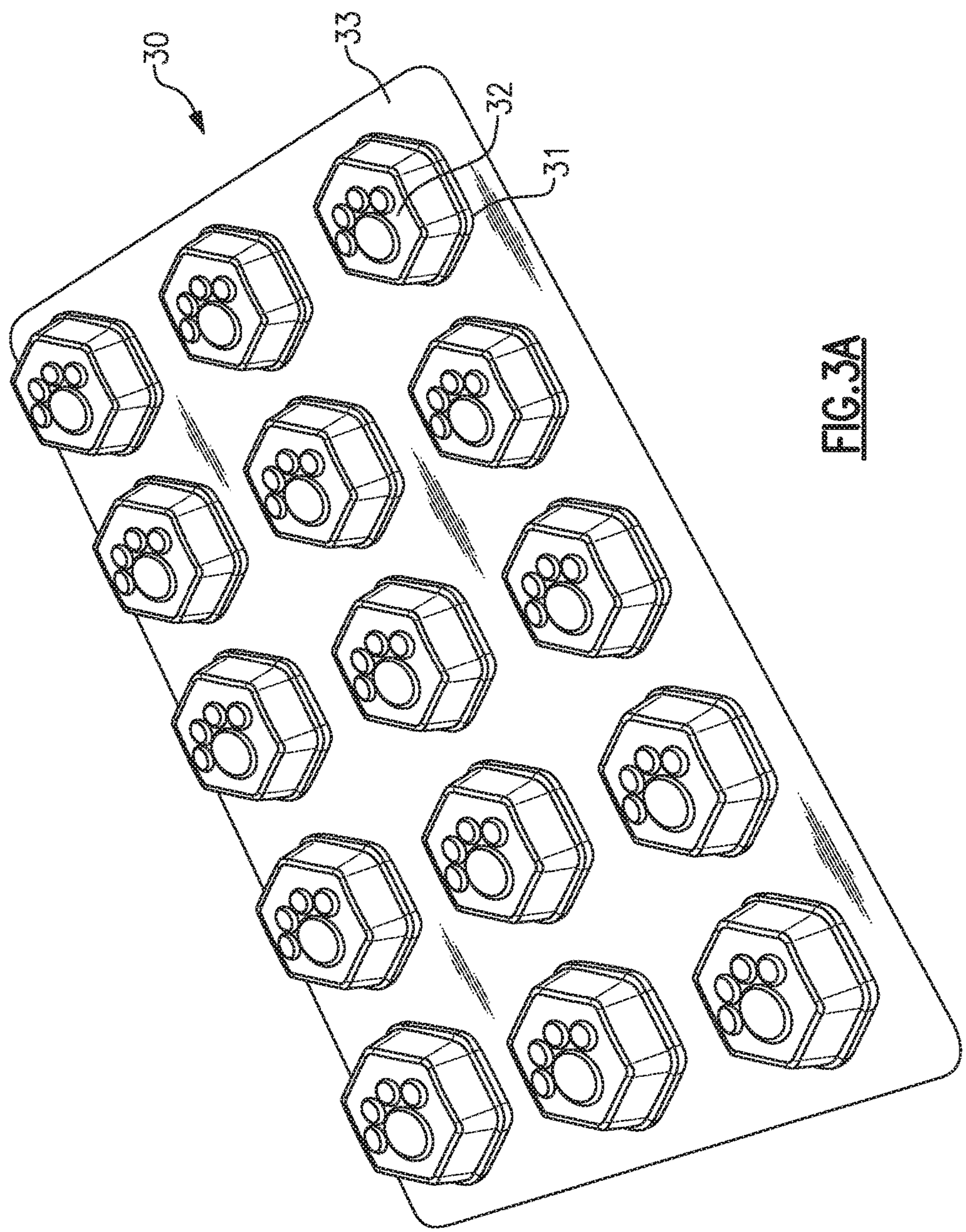
FIG. 3A is a perspective view of a primary package of one embodiment of the present invention.

Generally, the packaging for the pet food supplement of embodiments of the present invention can comprise a primary container, the primary container having at least one enclosure, the enclosure containing at least one dosage unit or supplement, and the dosage unit or supplement comprising a Probiotic supplement. The primary container can be a blister pack, as referred to hereinabove, blister card, or blister sheet as would be understood and commonly used in the art. The primary container can be of varying shape and size as desired based upon the number, size, and type of supplement contained therein and can be sized to be conveniently portable. Non-limiting examples of such shapes include round, oval, rectangular, square, triangular, trapezoidal, hexagonal, octagonal, paw print, and combinations thereof. The shapes can include other indicia, such as trademarks, brand names, trade dress features, and the like. For example, a paw print can be used, as shown in FIG. 3A. The paw print can be embossed or debossed. The primary container can also be formed to have means to permit separation of one or more portions of the primary container, i.e. one or more portions containing an enclosure. As would be understood by those of skill in the art, non-limiting examples of such means include perforations, scoring and combinations thereof.

As would be understood by those skilled in the packaging arts, to include structure and making of packaging, a blister pack can include one or more blister layers and a rupturable layer, the combination of which encloses one or more supplements. Thus, the blister layer can provide enclosures, in any suitable size and/or shape, for one or more supplements of any suitable size, shape, or form. Enclosures can be of any shape, non-limiting examples of such shapes include round, oval, rectangular, square, triangular, trapezoidal, hexagonal, octagonal, bone shape, steak shape, chicken leg shape, paw print shape, heart shape, fire hydrant, and combinations thereof. Of course, the supplement can take these shapes as well and can do at least when the enclosure is a mold for the supplement. The shapes can include other indicia, such as trademarks, brand names, trade dress features, and the like. For example, a paw print can be used, as shown in FIG. 3A. The paw print can be embossed or debossed. The rupturable layer permits the supplement to be removed from the blister pack. The rupturable layer can be formed over all or a portion of the blister layer. The rupturable layer can be affixed to the blister layer via the application of heat and pressure as is common in the art using conventional thermal forming methods, or by adhesive. Such blister packs can also comprise a backing layer that can be disposed on or over the rupturable layer to prevent unintended rupture and release of dosage units. Such backing layer can be peeled away to expose the rupturable layer when release of a supplement is desired. Such backing layer can be formed over all or a portion of the rupturable layer. Such a backing layer can be affixed to the rupturable layer and/or the blister layer via, for example, adhesive.

Blister layers can be made from a variety of suitable materials, non-limiting examples of which include polyvinyl chloride, thermoplastic materials, polyolefins and combinations thereof. The blister layer can be opaque, partially opaque, or transparent, and can be colorless or colored.

Rupturable layers can be made from a variety of suitable materials, non-limiting examples of which include metal foil, tempered metal foil, paperboard, polyvinyl chloride, polyolefins, polystyrenes, polyesters, fluoropolymer resins, and combinations thereof. The rupturable layer can also be formed as a laminate composed of a plurality of laminated layers of different materials, so long as its basic operation and rupturability is not affected. The rupturable layer can be of any desired color.

Backing layers can be made from a variety of suitable materials, non-limiting examples of which include paper, plastic, polyvinyl chloride, and combinations thereof. The backing layer can be of any desired color.

An example of one embodiment of a primary container is depicted in FIG. 3A. Blister pack 30 can contain individual blister enclosures 31 and blister layer 33. Blister pack 30 can include one or more blister layers 33 and a rupturable layer (not shown), the combination of which encloses one or more pet food supplements. Thus, the blister pack of FIG. 3A comprises at least one enclosure 31, the enclosure containing at least one pet food supplement 32, the pet food supplement comprising a Probiotic component. The rupturable layer can permit the supplement to be removed from the enclosure and thus the blister pack.

Figure 3B:
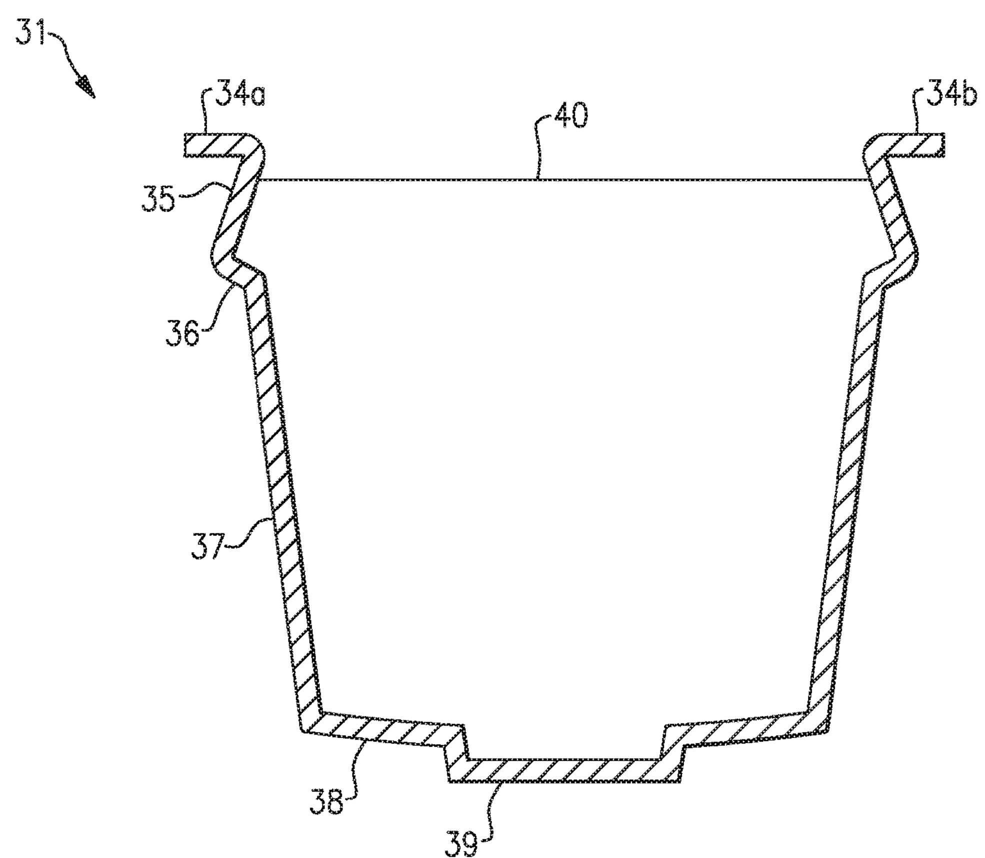
FIG. 3B is a section view of one embodiment of an enclosure of a primary package of one embodiment of the present invention.

A cross section of an enclosure of one embodiment of the present invention is depicted in FIG. 3B. Enclosure 31, as shown, can be a hexagon. However, it should be understood that enclosure 31 can be made into any shape, and it can be symmetrical, as shown in FIG. 3B, or asymmetrical. Enclosure 31 can include lips 34*a* and 34*b* that form part of the blister layer 33 of FIG. 3A. Lip 34*a* can then end at surface 35, which begins to form the surface of the enclosure 31. Surface 35 can extend outwards from the interior of the enclosure 31 and then inward towards the interior of the enclosure, forming surface 36, forming a slight v-shape. Surface 36 can then extend downward and lessen its angle with the vertical, forming body surface 37. Body surface 37 can form the main body of the supplement. Body surface 37 can then continue downward and end at bottom surface 38. Bottom surface 38 can form the top of the supplement and thus feature surface 39 can be used to include indicia and/or be made into a shape, such as a paw print, to the top of the supplement. Of course, feature surface 39 can be of any shape or size, as is described herein. In this configuration, the bottom surface 38 and the body surface 37 define an interior volume for the supplement.

Fill line 40 can represent the height of a mixture or a finished supplement when filled or hardened in the enclosure 31. Not wishing to be bound by theory, it can be advantageous for the finished supplement to fill the enclosure to fill line 40. In one embodiment, the mixture that forms the supplement can be filled into enclosure 31. Once filled, it can harden while in the enclosure, and thus can take the shape of the enclosure. Upon hardening, a tight fit is not always achieved between the supplement and the enclosure walls. In other words, as the supplement has hardened, it does not always stay tightly fit into enclosure 31. Some shrinkage can occur, some disturbance of the containers can occur, among other things, all of which can jostle the supplement from its original fit into the enclosure 31. Thus, if the supplement is jostled such that it is no longer tight fitting within the enclosure, it can have a tendency to move around within the enclosure 31. Thus, surfaces 35 and 36 can together define a frill that can be useful for preventing negative consequences due to the movement or jostling of the supplement. For example since the frill formed by surfaces 35 and 36 can form a v-shape, and the top of the supplement is at or around fill line 40, surface 35 of the frill can have a top position that can be inside of the outermost surface of the supplement, which can be at the transition between surface 35 and surface 36. In other words, the largest radius of the enclosure, or the supplement when deposited and hardened in the enclosure, which is formed by the transition between surface 35 and surface 36, is greater than the radius at the fill line 40. Thus, surface 35 can act as a stopper to prevent the supplement from falling out of the enclosure 31. Such a feature can be extremely advantageous when enclosures are used as both a mold and a holding/shipping/delivery vehicle.

Feature surface 39, as mentioned above, can include any indicia and/or be made into a shape. As shown, feature surface 39, when formed into a shape, can form a surface exterior to that of bottom surface 38. When enclosure 31 is an enclosure as part of a blister pack, feature surface 39 can serve many purposes. For example, when feature surface 39 forms a surface exterior to that of bottom surface 38, it can allow a consumer an easier way to push out the supplement out of the enclosure and through any seal that can be present. Surface feature 39 can also depict a shape or indicia that can be correlated to a certain type of benefit provided, to a certain brand, or to certain ingredients of the supplement, as is described herein. Thus, this surface feature 39 can be an easy identifier to a consumer if the blister pack 30 is somehow separated from its secondary container that includes indicia identifying the type of supplement contained therein.

Furthermore, the frill formed by surfaces 35 and 36 can allow for removal of the supplement without deformation. Such removal can be achieved by maintaining a radius geometry in the frill and a minimum depth of the frill. Also, the inclusion of a draft angle of the frill of approximately 5 degrees facilitates ease of dispensing without product deformation.

Figure 4:
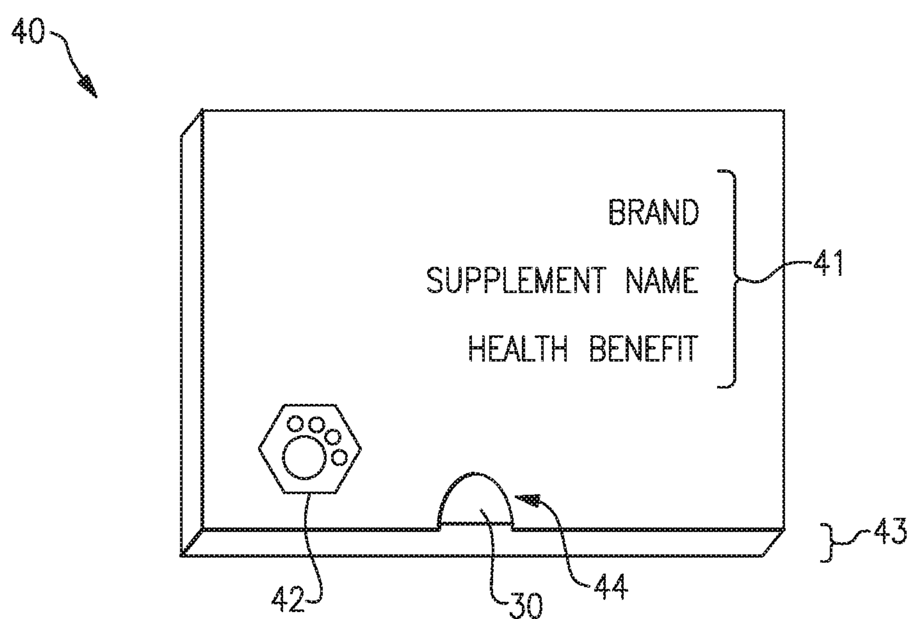
FIG. 4 is a perspective view of a secondary package of one embodiment of the present invention.

The packaging for the pet food supplement of embodiments of the present invention can also optionally include a secondary container. A secondary container can contain one or more separate, discrete primary containers and/or can be formed as an integrated structure with the primary container. The secondary container can be of varying shape, size and form as desired based upon the number, size and type of primary containers contained therein and/or formed as a part thereof, and can be sized to be conveniently portable. Non-limiting examples of such shapes and forms include round, oval, rectangular, square, triangular, trapezoidal, octagonal, foldable and combinations thereof. Non-limiting examples of secondary containers include boxes and cartons. Non-limiting examples of integrated primary and secondary containers include tri-fold structures in which a primary container is affixed to a secondary container that folds over one or more portions of the primary container; and structures shaped and structured similarly to a book in which one or more primary structures form page-like structures bound within a secondary container outer covering forming an integrated structure. The primary and secondary containers can also be separate, discrete elements, and one or more primary containers can be removed from the secondary container. The secondary container can be made from a variety of materials, non-limiting examples of which include paper, paperboard, cardboard, plastic, and combinations thereof. FIG. 4 depicts one embodiment of a secondary container and a primary container. Secondary container 40 can be a carton or box. Primary container 30 can be a blister pack, as shown in FIG. 3A and as shown contained within carton 40 in FIG. 4. In this embodiment, the secondary container 40 also includes indicia 41, which can aid in directing a consumer or a veterinarian in the selection of an appropriate supplement. In this embodiment, the indicia are text. Other non-limited examples of indicia are shapes, objects, pictures, brand names, words associated with benefits, etc. Particular indicia are described hereinafter. Secondary container 40 can also comprise a viewing aperture 42. Viewing aperture 42 can permit viewing of a portion of primary container 30 therethrough. As shown in the embodiment of FIG. 4, the supplement 32 of FIG. 3A can be viewable through the viewing aperture 42. The depth 43 of primary container 40 can influence the distance that the supplement protrudes through the viewing aperture 42. For example, it depth 43 is sufficiently deep such that it is greater than the height of a supplement, the supplement will not protrude through the viewing aperture. However, if the depth is less than the height of the supplement, the supplement, or at least a portion of the primary container, will protrude through the viewing aperture. In addition, secondary container 40 can have an indentation 44 that can be utilized by a consumer to aid in removal of primary container 30 from secondary container 40.

As described above and as is shown in FIG. 4, the secondary container can also provide one or more viewing apertures, such as viewing aperture 42, that can be an uncovered void in the secondary container or can be a void covered by a material, non-limiting examples of which include transparent plastic materials. A viewing aperture 42 can be used to allow viewing of one of the products in the primary container, and, as described above, it can allow the supplement to protrude therethrough.

The secondary container can also aid in the storage, transport, distribution, display, and/or sale of the primary container and the supplement contained therein.

As also described above and as is shown in FIG. 4, the secondary container can also comprise one or more receiving portions to aid in handling of the primary and/or secondary container, such as indentation 44. Non-limiting examples of such receiving portions include one or more indentations in the secondary container to allow access to and gripping of a primary container to permit removal of the primary container from the secondary container.

Such a combination of primary container and secondary container can comprise an easy to dispense unit dosage of a supplement. Such a combination can be beneficial for a supplement comprising a Probiotic component. The further combination of product form as a supplement and the primary container and secondary container also promotes and encourages compliance. For example, a Probiotic supplement can have a regime associated with it such that a beneficial dosage amount can be one supplement per day. Such a dosage amount should be easily administrable by a consumer. It has been found that the combination of a supplement in a primary container within a secondary container promotes such a regime. Thus, this combination encourages and promotes regiment compliance via an easy to use dosage form.

The primary container and/or the secondary container and/or the supplements themselves can also comprise indicia, which indicia can enable a user to identify the appropriate package and/or appropriate supplement to select based on the consumer's needs for its pet. Thus, the indicia can communicate with the consumer to identify the appropriate treatment and use thereof.

The supplements can be arranged in the primary container in any number of ways, depending on the system and the desired treatment and/or benefit. For example, a primary container can comprise multiple groups of supplements arranged in multiple rows and/or columns of supplements, each supplement of a particular row or column can be the same type of supplement with each particular row or column of supplements comprising a different Probiotic component, or the same Probiotic component, for providing particular health benefits, as mentioned above. Thus, in one embodiment, a blister pack as a primary container can have three rows or columns, and the first row can comprise a Probiotic component associated with a first health benefit, the second row can comprise a Probiotic component associated with a second health benefit, and the third row can comprise a Probiotic component associated with a third health benefit. Any number of rows or columns can be used, and any number of Probiotic components and associated health benefits can be used. Each particular row of Probiotic can comprise a particular shape, particular indicia, and/or particular colors that can be associated with particular health benefits. Thus, a form of multi-pack of supplements for multiple health benefits can be embodied.

Figure 5:
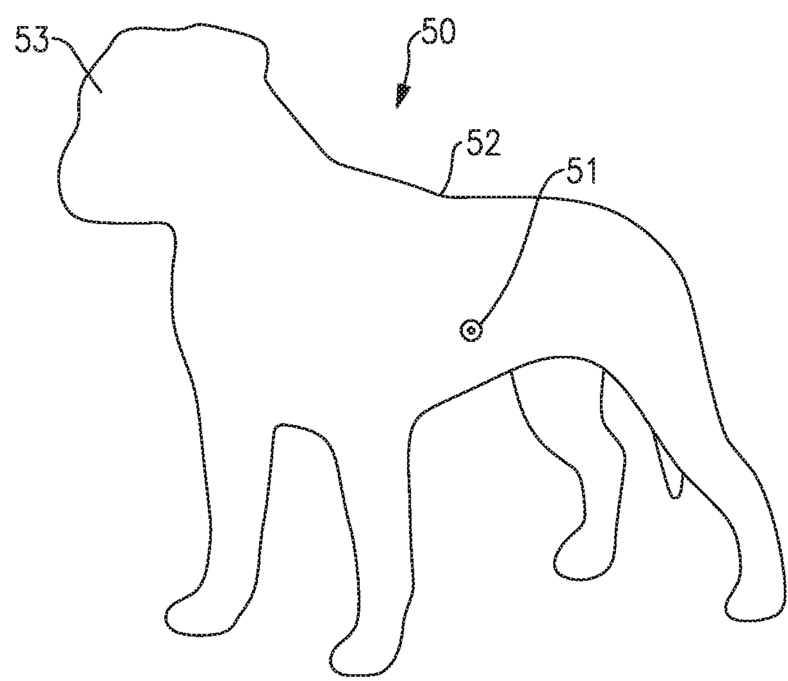
FIG. 5 is a perspective view of one form of indicia that can be used with embodiments of the present invention.

Moreover, color can be utilized to indicate the health benefit provided by a supplement. A color can be associated with a certain health benefit provided. For example, green can be used to indicate a gastrointestinal benefit that can provided by a supplement. Green can be used as indicia on the primary container and/or on the secondary container. Any color can be used, and any color can be matched with a specific health benefit. The color can be used as indicia in any kind of form. For example, the color can be a stripe, or multiple stripes, going across any portion of the secondary or primary container. The color can be in the form of other shapes, stripes, outlines of the containers. Colors can be used in an array, as is described in more detail below. More than one color can be used to indicate more than one benefit being provided. Furthermore, other certain indicia can be used, particularly consumer conscious indicia. Consumer conscious indicia can include, for example, a picture, or outline, of a companion animal, such as a dog, as shown in FIG. 5. A picture or outline of a dog 50 can include any variation of the breeds of dogs and is not limited in any way by the outline shown in FIG. 5. In FIG. 5, other indicia can be included to form consumer conscious indicia. As non-limiting examples, the outline of the dog 50 can include target areas. Target areas can be areas or body parts of the dog that are highlighted, pointed to, or emphasized in any way and can signal the area of the dog, or other companion animal, that the type of health benefit that is being provided by the supplement. For example, target area 51 can generally be located in or around the gastrointestinal tract of the dog. The location can then signify to a consumer that the supplement contained within that secondary container can be a supplement that is for treating the gastrointestinal health of the dog. Other non-limiting areas of the dog that can be used, for example, would include skin and coat shown by 52, eye health shown by 53, diarrheal, and all other areas or body parts of the dog or companion animal that can be represented by health benefits that a supplement can treat. Such health benefits have been identified above. Moreover, the actual target can be exemplified by any indicia. Non-limiting examples include trademarks, logos, stars, targets, highlighting, colors, etc. For example, a trademark can be used at the point of treatment, such as a paw print on the gastrointestinal tract. Of course, any animal can be used. Combinations of indicia can also be included such that, for example, a secondary package can have green indicia, a dog can have a target area located around the intestinal tract, a particularly shaped hexagon supplement can be shown in the viewing aperture, and a "GI" text can be used on the secondary container for easy viewing, and this combinations of indicia all can represent a particular pet food supplement for treating the gastrointestinal tract of the dog. Of course, any combination of these indicia can be used for a specific health benefit and can be used in combination with any of the other packaging aspects and supplement forms.

Figure 6:
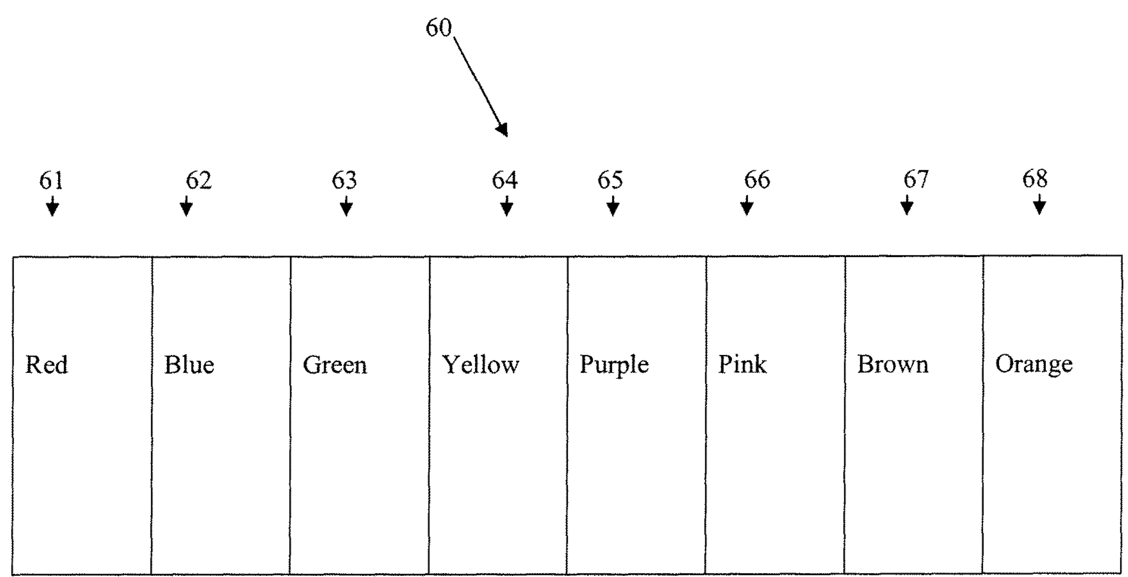
FIG. 6 is a perspective view of one form of indicia that can be used with embodiments of the present invention.

A color sleeve or meter can also be included. For example, any secondary container containing a supplement sold by a specific company can include a color meter. Such a color meter can include an identification of all of the health benefits and their associated color indicia used on the primary or secondary containers. In a non-limiting example shown in FIG. 6, a color meter 60 can be rectangular, or any other shape, and can have color strips 61-68. Color strips 61-68 can be an actual color. Color strips 61-68 can be labeled in any fashion with a health benefit that is associated with that color. Such a color strip can be included on all containers such that a consumer can be informed, or communicated with, of the supplement offerings for particular health benefits of a particular company and can then best locate the particular supplement and health benefit easily by using color.

The supplement itself can be of any various colors. Such color can again be used to indicate the type of health benefit being provided, as above. In one embodiment, the supplement can be generally beige or brown in color. In other embodiments, the supplement can be of any color. The colors, as above, can be indicative of the health benefit. It is also envisioned that supplements can comprise multiple Probiotic components such that a single supplement provides multiple health benefits. In such a case, the supplement can be any color, or it could be a marbling of colors. Such a marbling of colors can indicate multiple health benefits since multiple colors are present.

The colors can be represented by the Hunter Lab color space. As is well known in the art, the Hunter values are a measure of reflected light and use three parameters: L, a, and b. Generally, "L" denotes the level of white/black, or lightness, and the "a" and "b" values are termed the opponent color axes. The "a" opponent color axis represents, approximately, the redness or greenness (positive or negative) while the "b" opponent color axis represents the yellowness or blueness (positive or negative). The color white can be represented by an "L" value of 100 while the color black is represented by an "L" value of 0. The color gray can be represented by "L" values between 0 and 100 at a and b values of zero. The color red can be represented by a positive "a" value while the color green can be represented by a negative "a" value. The color yellow can be represented by a positive "b" value while the color blue can be represented by a negative "b" value. All values included and therebetween for each of the colors associated with the Hunter values are within the scope of the embodiments of this invention and can be represented as red, green, blue, yellow, purple, tan, brown, beige, black, white, gray, orange, pink, lavender, pink and combinations and mixtures thereof based on their particular Hunter Lab values.

Many test methods for measuring the Hunter Lab color and its associated values are well known in the color art. Any of those test methods can be used within embodiments of the present invention. One non-limiting example of a test method is disclosed hereinafter.

Color-containing surfaces are tested in a dry state and at an ambient humidity of approximately 500%.±0.2%. Reflectance color is measured using the Hunter Lab LabScan XE reflectance spectrophotometer obtained from Hunter Associates Laboratory of Reston, Va. The spectrophotometer is set to the CIELab color scale and with a D50 illumination. The Observer is set at 10°. The Mode is set at 45/0°. Area View is set to 0.125". Port Size is set to 0.20" for films. Area View is set to 1.00", and Port Size is set to 1.20" other materials. The spectrophotometer is calibrated prior to sample analysis utilizing the black and white reference tiles supplied from the vendor with the instrument. Calibration is done according to the manufacturer's instructions as set forth in LabScan XE User's Manual, Manual Version 1.1, August 2001, A60-1010-862.

If cleaning is required of the reference tiles or samples, only tissues that do not contain embossing, lotion, or brighteners should be used (e.g., Puffs® tissue). Any sample point on the externally visible surface of the element containing the imparted color to be analyzed should be selected. Sample points are selected so as to be close in perceived color. A sample of the material being tested is placed over the spectrophotometer's sample port. The sample comprising the color to be analyzed must be larger than the sample port to ensure accurate measurements. A white tile, as supplied by the manufacturer, is placed behind the externally visible surface. The L*, a*, and b* values are read and recorded. The externally visible surface is removed and repositioned so that a minimum of six readings are obtained for the externally visible surface. If possible (e.g., the size of the imparted color on the element in question does not limit the ability to have six discretely different, non-overlapping sample points), each of the readings is to be performed at a substantially different region on the externally visible surface so that no two sample points overlap. If the size of the imparted color region requires overlapping of sample points, only six samples should be taken with the sample points selected to minimize overlap between any two sample points. The readings are averaged to yield the reported L*, a*, and b* values for a specified color on an externally visible surface of an element.

It is also envisioned that the containers and products of the present invention can communicate with a consumer, as described above. Such communication can be intuitive. For example, after usage of a particular supplement, a consumer may relate a particularly shaped supplement with a particular health benefit. Moreover, a consumer may relate a particularly colored container or supplement with a particular health benefit. Any other indicia described above may be related by a consumer with a particular health benefit. Thus, at a point, the supplement and/or the containers may intuitively communicate with a consumer such that the consumer readily identifies the supplement and/or the container with a certain health benefit, and such identification by the consumer may be based on the indicia related to the container and/or supplement.

Embodiments of the present invention also include an array. An array of containers, either primary or secondary, can be arranged. An array of supplement containers can comprise, for example, a first container, such as either a primary or a secondary container, and a second container, such as either a primary or a secondary container. In a non-limiting example, a first container comprises a secondary container housing a primary container of supplements and a second container comprises a secondary container housing a primary container of supplements. The first container and the second container may comprise indicia, either textual or non-textual. The indicia may be associated with a health benefit that is provided by the supplement. The indicia may also include a color in the form of a stripe on the secondary container, whereby the color also is associated with a particular health benefit. Of course, multiple indicia can be used.

The array may comprise a third, a fourth, or any number of further containers. An array may comprise an entire lineup of offerings by a specific company for a specific product, such as a Probiotic supplement. The further containers of the array may comprise indicia.

In some embodiments, a secondary container can contain a primary container, which can contain a single type of supplement, for example supplements for providing a first type of health benefit, such as increased mobility. Another primary container can comprise another single type of supplement, for example supplements for providing a second type of health benefit such as skin and coat health. The primary containers, the supplements, and/or the secondary container can comprise indicia, as described hereinabove, to enable a user to identify the appropriate health benefit being provided by the supplement, and thus select the appropriate supplement and use thereof. These containers can be arranged in an array, as described above, such that a mobility supplement and a skin and coat supplement can be provided on a store shelf, in a veterinarian's office, or in any display used to communicate the product. The health benefit can be any of those described hereinabove. Such an array of primary containers and/or secondary containers can further comprise indicia located on the primary container, as described hereinabove. A secondary container, which includes a primary container, can contain at least one, two, three, or any number of elements or forms of indicia on the package. In one non-limiting example, a secondary container, which includes a primary container, can contain at least three elements or forms of indicia on the container. Those three forms of indicia can be a picture or drawing of a dog, a supplement, such as in the form of a hexagon, and a brand name, such as Iams™. Other forms of indicia can be included and are described hereinabove.

It also envisioned that a single container, whether primary or secondary, can include different types of products, or supplements, such that a single container has a first supplement for providing a first health benefit and a second supplement for providing a second health benefit. Additional supplements can be included. A secondary container can also include a first primary container of supplements for providing a first health benefit and a second primary container for providing a second health benefit. Additional containers and supplements can be included.

Multi-packs of secondary containers can also be envisioned. A multi-pack may include one or more secondary containers, which may contain one or more primary containers, which may include one or more supplements, wherein the supplements can provide multiple health benefits. Thus, a multi-pack of containers may include several supplements for providing several health benefits. In such a scenario, a consumer could purchase one multi-pack that contains many supplements for providing many health benefits.

In addition to the supplement containers described hereinabove, marketing articles such as in-store ads, in-store flyers, print ads, periodical ads, billboards, end-of-aisle displays, pallet wrappers, additional packaging, corrugated boxes, floor ads, window stick-on ads, shelf talkers, internet sites, etc. associated with the supplement products may also comprise indicia. The indicia on the marketing articles may be matched to a health benefit provided by the supplement.

The present invention can also include kits that can comprise one or more systems of the present invention packaged in combination with complementary pet products, such as any type of product normally found in a pet supply store.

Other Forms of the Supplement

The final pet food supplement can take many forms of a pet food, such as a tablet, capsule, or the like, or other forms such as biscuits, chews, edible films or other treats, which are intended to be used not as entire pet meals but in addition to regularly consumed pet food meals.

Many known pet food compositions and supplements are available in a variety of forms and textures. Most of these pet food compositions tend to be inflexible, such as extruded pet food kibbles, compressed tablets, or gelatin capsules. Depending upon the intended use or function of the composition, inflexibility may be a property that is desirable or undesirable. For example, a product texture that is suitable to healthy pets, such as a kibble, provides the desirable advantage of enabling the pet to easily consume to provide the nutrients necessary to sustain life. However, for pets with oral disease, hard textures can pose an ergonomic challenge. In those instances, products such as a tablet, extruded, or baked compositions are harder to fracture during mastication due to tooth loss or health status. This problem is especially true for canines with brachycephalic skulls, such as boxers, pugs, etc., which are prone to oral and mastication issues. In this instance, a softer composition would result in better compliance and consumption unless the form is found to be unacceptable to the animal. Gelatin capsules are an example of a supplement that can provide less fracture force than a traditional extruded or baked composition, but the texture does not ensure compliance with all canines. Rinses, gels, and sauces can also provide broader appeal to dogs with oral issues, but they often require the consumer to mix or add the fluid to another substrate for consumption, or they must place the fluid on a secondary deliver vehicle such as a bowl, brush, etc. These further forms are contemplated as within the scope of embodiments of the present invention.

It can also be advantageous to provide pet food compositions/supplements with Probiotic component benefits that can be delivered in a stand alone form that can be easily handled by the consumer for direct feeding to a pet. Similarly, little effort should be required by the pet to consume the product to achieve a benefit, regardless of life stage or health status. A non-limiting example of this embodiment can be the use of a fat based Probiotic treat that is a solid at ambient temperature, and a liquid at the target animal body temperature. In that manner, the treat could be hand fed to a pet, but the form would provide a soft texture for the pet to chew making it suitable for all breeds and life stages. Additionally, if prolonged mastication were required, the treat would quickly liquefy in the animal's mouth to deliver the desired health benefit. This further form is contemplated as within the scope of embodiments of the present invention.

Still other forms of the supplement can be envisioned. In one embodiment, compressed tablets can be made. A compressed tablet can comprise any of the ingredients described hereinabove. In one process, the Probiotic component can be combined with an excipient, non-limiting examples of which include fibers, other fillers, and pre-biotics. A binder can be included, non-limited examples of which include cellulose, methyl cellulose, polyvinyl pyrrolidone, and polyethylene glycol. This mixture can be put through a fluid bed rotor granulator, as is known to those of skill in the art. Upon drying, lubricants, non-limiting examples of which include talic, silica, and fats, and disentegrants, non-limiting examples of which include starch, cellulose, cross-linked polyvinyl pyrrolidone, sodium starch glycolate, sodium, and carboxymethyl cellulosemethycellulose can be added. Upon compression, coating can be done along with other standard procedures as known to those of ordinary skill in the art, including cooling, to form a tablet comprising a Probiotic component.

Another form can be compressed tablets enrobed with a coating. The compressed tablet above can be made. However, an additional step can be included after compression such that a coating, such as the Blommer white kreemy coating component described hereinabove, can be used to enrobe the tablet. The resulting product is an enrobed compressed tablet comprising a Probiotic component.

Another form can be lentils, which can be pan coated. Lentils can be made by using the cocoa butter, Probiotic, and Blommer coating mixture, as hereinabove described. That mixture can be deposited onto rollers at around 10 degrees below 0 F., depending on the speed of the rollers. Pan coating can then be done at around 68 degrees F. for about three hours using medium tumble. A 1 to 11 6× sugar and 1 to 70 gum mix can be added with additional pan coating at about 75 to 100 degrees F. Drying can then be done at about 60 to 70 degrees F. for at least 10 hours. The pan coater can then be run again, at about 100 degrees F. for about 20 minutes, and 1 to 6.6 74% syrup mixed with a colorant can be added during the run. The pan coater can be run for an additional two minutes at around 85 degrees F. while adding shellack with alcohol. A final lentil can then be formed Another form can be lentils, which can be pan coated with a second high melting point layer. Lentils can be made by using the cocoa butter, Probiotic, and Blommer coating mixture, as hereinabove described. That mixture can be deposited onto rollers at around 10 degrees below 0 F., depending on the speed of the rollers. The pan coater can then be run for about 30 minutes, and a 1 to 11 6× sugar and 1 to 70 gum mix can be added with additional pan coating at about 75 to 100 degrees F. Drying can then be done at about 60 to 70 degrees F. for at least 10 hours. At this point, it can be pan coated with a higher melting point fat. At least options can be chosen after pan coating with a higher melting point fat: 1) cool the lentils down for a final product; 2) run the pan coater for an additional amount of time at 85 degrees F., which can be 2 minutes, with the addition of shellack with alcohol, and then cool down; or 3) run the pan coater for an additional amount of time at a temperature of about 100 degrees F. while mixing in 1 to 6.6 74% syrup with a white colorant, followed by running the pan coater for an additional amount of time at 85 degrees F., which can be 2 minutes, with the addition of shellack with alcohol, and then cool down.

With respect to the second high melting point layer lentil, two other options exist for processing before depositing on the rollers at around 10 degrees below 0 F.: 1) the mixture can be simply dropped on moving belt in the appropriate sized lentil followed by crystallizing and cooling, after which one can pan coat at approximately 68 degrees F. for about three hours followed by any of the processing options above with respect to the pan coater; or 2) the mixture can be deposited into forms in cavity trays, then followed by crystallizing and cooling, then removed from the tray, and then one can pan coat at approximately 68 degrees F. for about three hours followed by any of the processing options above with respect to the pan coater.

A seeding crystal can be included. A seeding crystal can be used to enable the product to be quickly re-formed into its solid form if melting or other means as caused the supplement to lose its desired hard form. A seeding crystal, as is well known in the art, comprises a small single crystal that can be placed into a saturated or supersaturated solution to grow a large crystal. In some embodiments of the present invention, a seeding crystal can assist in the crystallization of a supplement if it becomes a liquid due to high temperatures.

Example

In one example, pet supplements or treats are to be made. Each supplement or treat will contain approximately $5\times10^{10}$ CFU of Probiotic microorganism. Each treat will weigh approximately 2.5 grams and have a composition of Probiotic animalis at 10%, cocoa butter at 3.39%, Blommer white coating at 86.28%, and 37542 Brown Dispersion OB paprika colorant at 0.33%, by weight of the total composition. This composition is prepared as follows:

In a temperature and humidity controlled chamber of approximately 10% or less relative humidity and at 100 degrees F., the cocoa butter is heated to about 130 degrees F. and then cooled down to about 105 degrees F. The cocoa butter and Probiotic are mixed thoroughly in a mix tank until a dough-like consistency is reached. At this point, approximately 30% of the white coating, which has been in a tank outside of the controlled chamber and is has been held at about 105 degrees F. for about 24 hours, is added to the cocoa butter and Probiotic mixture. This combined mixture is thoroughly mixed for about five minutes or until a smooth consistency is reached. The remainder of the white coating is added to a separate mix tank. At this time, the combined mixture, which has been thoroughly mixed for about five minutes or until a smooth consistency is reached, is added to the remainder of the white coating in the separate mix tank. This mixture is then mixed thoroughly for about five minutes. At this time, the colorant is added to the mixture. This final mixture is mixed thoroughly for about 20 minutes, resulting in a supplement composition that is ready for addition to a mold for hardening and packaging.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An article of manufacture to deliver a probiotic supplement for a pet, comprising:

a primary container comprising a blister pack;

wherein the blister pack comprises an enclosure and wherein the enclosure comprises:

a bottom surface and a body surface, which together define an interior volume;

a lip disposed around the top of the enclosure;

a frill formed by a first surface and a second surface wherein the first surface extends outwards from the interior volume and the second surface extends inwards toward the interior volume;

wherein the second surface of the frill is connected to the body surface which then extends downwardly to the bottom surface, wherein the frill is between the body surface and the lip and wherein the widest radius formed by the fill is between the bottom surface and the lip and is larger than the radius formed by the lip and wherein the frill is convex relative to the interior volume; and a supplement within the enclosure, wherein the supplement is molded by and has a shape of the enclosure;

wherein the supplement fills the enclosure past the widest radius of the frill and defines a top surface at a fill line near the top of the frill, wherein radius of the supplement at the widest radius of the frill is greater than a radius of the enclosure at the fill line.

2. The article of manufacture of claim 1 and wherein the supplement comprises indicia.

3. The article of manufacture of claim 2 and wherein the indicia comprises a logo or trademark.

4. The article of manufacture of claim 1 and wherein the enclosure comprises a thermoformed plastic.

5. The article of claim 1 and wherein the container comprises indicia.

6. The article of claim 5 and wherein the indicia comprise a color and wherein the color is associated with a health benefit that is provided by the supplement.

7. The article of manufacture of claim 1 wherein the enclosure is adapted to be used as a mold and a shipping vehicle.

8. The article of manufacture of claim 1 wherein the enclosure is adapted for removal of the supplement without deforming the supplement.

9. The article of manufacture of claim 1 wherein the Probiotic component comprises at least about $10^5$ colony forming units per gram of supplement and wherein Probiotic component has a shelf life of at least about three months.

10. The article of manufacture of claim 1, wherein the frill has a draft angle of 5 degrees such that the supplement can be removed without deforming the supplement.

11. The article of manufacture of claim 1, wherein the top surface of the supplement is between the widest radius formed by the frill and the lip.

12. The article of manufacture of claim 1, wherein the draft angle of the frill is approximately 5 degrees.

* * * * *